(12) United States Patent
Weber

(10) Patent No.: US 8,226,063 B2
(45) Date of Patent: Jul. 24, 2012

(54) POWER SEAT TRACK DRIVE ASSEMBLY

(75) Inventor: James L. Weber, West Bloomfield, MI (US)

(73) Assignee: Intier Automotive Inc, Newmarket (CA)

( * ) Notice: Subject to any disclaimer, the term of this patent is extended or adjusted under 35 U.S.C. 154(b) by 496 days.

(21) Appl. No.: 12/446,047

(22) PCT Filed: Oct. 23, 2007

(86) PCT No.: PCT/CA2007/001856
§ 371 (c)(1),
(2), (4) Date: Apr. 17, 2009

(87) PCT Pub. No.: WO2008/049200
PCT Pub. Date: May 2, 2008

(65) Prior Publication Data
US 2010/0320352 A1 Dec. 23, 2010

Related U.S. Application Data

(60) Provisional application No. 60/853,630, filed on Oct. 23, 2006.

(51) Int. Cl.
*F16M 13/00* (2006.01)
(52) U.S. Cl. ...................................... 248/429; 297/344.1
(58) Field of Classification Search .................. 248/424, 248/429, 430; 297/344.1, 344.11
See application file for complete search history.

(56) References Cited

U.S. PATENT DOCUMENTS

| | | | |
|---|---|---|---|
| 4,802,374 A | 2/1989 | Hamelin | |
| 5,267,717 A | 12/1993 | Isomura | |
| 5,314,158 A | 5/1994 | Mouri | |
| 5,816,555 A | 10/1998 | Ito et al. | |
| 6,032,550 A * | 3/2000 | Rugh | 74/425 |
| 6,260,922 B1 | 7/2001 | Frohnhaus et al. | |
| 6,322,146 B1 | 11/2001 | Fisher, Jr. et al. | |
| 6,575,421 B1 | 6/2003 | Houston et al. | |
| 6,915,998 B2 | 7/2005 | Borbe et al. | |
| 6,971,620 B2 | 12/2005 | Moradell et al. | |
| 7,048,244 B2 | 5/2006 | Hauck | |
| 7,051,986 B1 | 5/2006 | Taubman | |
| 7,340,974 B2 * | 3/2008 | Landskron et al. | 74/425 |
| 7,556,234 B2 * | 7/2009 | Ito et al. | 248/429 |

(Continued)

FOREIGN PATENT DOCUMENTS

DE 20320715 U1 1/2005
(Continued)

*Primary Examiner* — Terrell McKinnon
*Assistant Examiner* — Steven Marsh
(74) *Attorney, Agent, or Firm* — Miller Canfield

(57) ABSTRACT

An adjustment mechanism is disclosed for moving a movable member relative to a fixed member. A threaded screw is fixedly secured to the fixed member. A gear is rotatably disposed about the threaded screw. A housing includes a bore and an opening in a lower surface. A rotatably driven worm is disposed within the bore and includes a threaded outer surface that protrudes through the opening in the lower surface of the housing and threadably engages the gear. A generally U-shaped retainer strap partially surrounds the gear and is adapted to couple the housing and gear together to align and preload the worm and gear. A generally U-shaped bracket is adapted to be fixedly secured to the movable member, wherein the gear, housing, worm, and retainer strap are disposed within the bracket and the threaded screw passes through a pair of openings in the bracket.

36 Claims, 22 Drawing Sheets

U.S. PATENT DOCUMENTS

| | | | |
|---|---|---|---|
| 7,712,391 B2 * | 5/2010 | Hofschulte et al. | 74/425 |
| 7,802,487 B2 * | 9/2010 | Knopfle et al. | 74/89.14 |
| 2005/0253036 A1 | 11/2005 | Li et al. | |
| 2006/0060015 A1 | 3/2006 | Hofschulte et al. | |
| 2006/0170266 A1 * | 8/2006 | Landskron et al. | 297/344.11 |
| 2006/0249644 A1 | 11/2006 | Folliot et al. | |

FOREIGN PATENT DOCUMENTS

| | | |
|---|---|---|
| DE | 102004046048 B3 | 12/2005 |

* cited by examiner

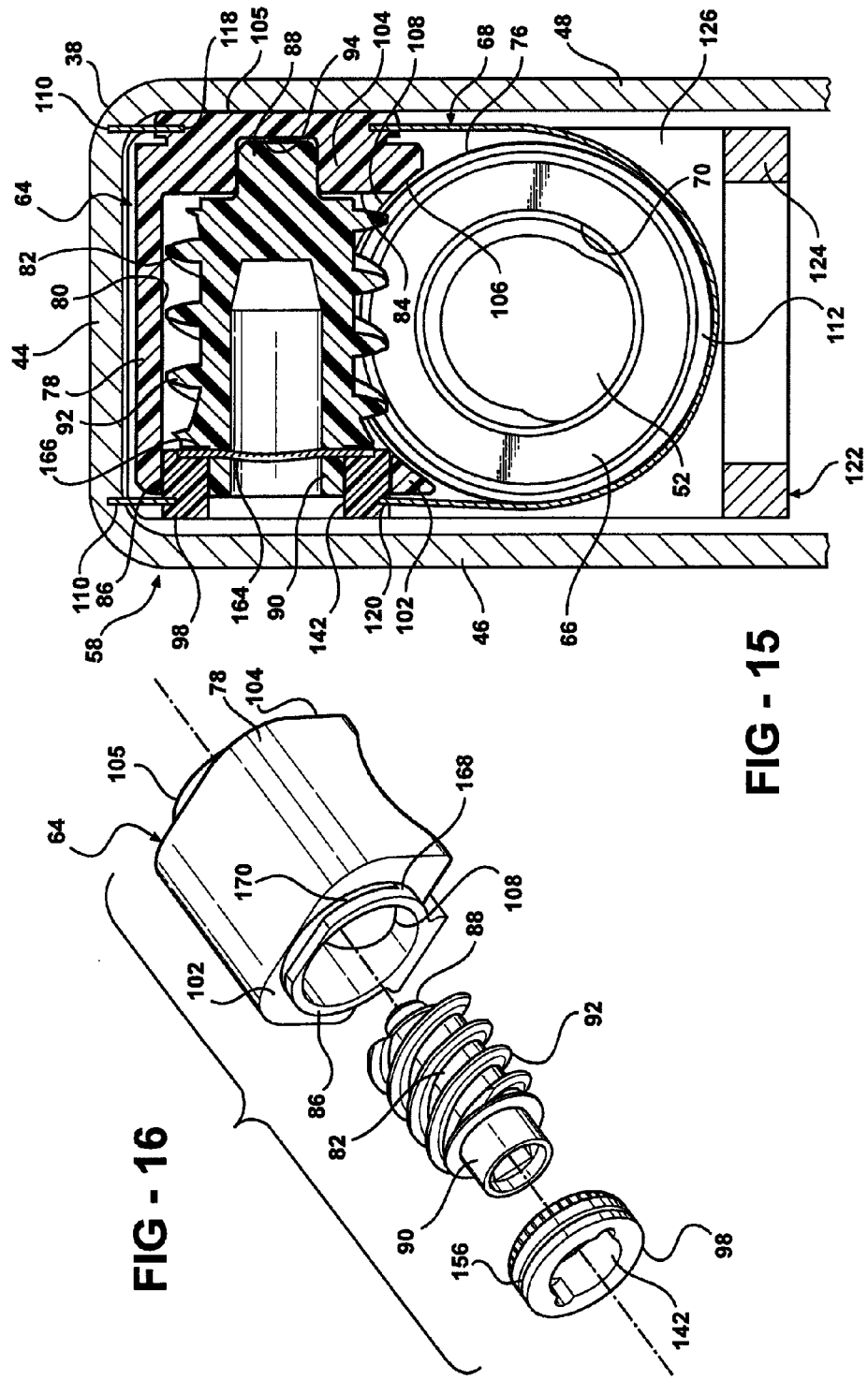

POWER SEAT TRACK DRIVE ASSEMBLY

CROSS REFERENCE TO RELATED APPLICATION

This application claims priority to and all the benefits of U.S. Provisional Application Ser. No. 60/853,630, filed on Oct. 23, 2006 and entitled "Power Seat Track Drive Assembly."

BACKGROUND OF THE INVENTION

1. Field of the Invention

The invention relates to a seat track for an automotive vehicle seat assembly. More particularly, the invention relates to a power seat track drive assembly for providing fore and aft movement of a seat assembly along a floor of an automotive vehicle.

2. Description of Related Art

Automotive vehicles include seat assemblies for supporting seat occupants within a passenger compartment of the vehicle. Typically, seat assemblies include a generally horizontal seat cushion spaced above a floor of the vehicle and a generally vertical or upright seat back. The seat back is commonly operatively coupled to the seat cushion to allow for selective pivotal adjustment of the seat back relative to the seat cushion between a plurality of reclined seating positions.

Many seat assemblies also include a seat track assembly coupled between the seat cushion and the floor to provide fore and aft movement of the seat assembly within the vehicle. Typically, the seat track assembly includes a lower track fixedly secured to the floor of the vehicle and an upper track slidably engaging the lower track. The upper track is fixedly secured to a bottom surface of the seat cushion to allow for sliding movement of the seat assembly along the lower track.

It is well known in the vehicle seating art to provide a power seat track assembly driven by an electric motor for moving the upper track, and thus the seat assembly, relative to the lower track. Many such power seat track assemblies include a conventional gearbox or drive assembly operatively coupled in a longitudinal channel between the upper and lower tracks for converting rotational input of the motor into linear movement of the seat assembly. Several such examples are described in U.S. Pat. Nos. 6,915,998; 6,575,421; 6,322,146; 6,260,922; 5,816,555; 5,314,158; 4,790,202; and U.S. Patent Application Nos. 2006/0213302 and 2005/0082890. Typically, a threaded spindle or lead screw is fixedly secured to the lower track and the gearbox is operatively coupled between the lead screw and the upper track. The gearbox includes a housing having through holes or bores that are offset 90 degrees to align and retain a worm and a gear or worm wheel. The gear includes a threaded internal bore for threadably engaging the lead screw and a geared outer surface for meshing with the worm. In an arrangement of this kind the worm is driven by a shaft extending from the motor which in turn causes the gear to rotate. Rotation of the gear causes the gear to move in a longitudinal direction along the fixed lead screw which leads to the desired movement of the upper track relative to the lower track.

Because the longitudinal channel between the upper and lower tracks is limited, packaging of the gearbox is an important issue. Therefore, it is desirable to provide a gearbox or drive assembly incorporated into a power seat track assembly wherein the gearbox or drive assembly has a simple and robust design that is cheap to manufacture and easy to assemble.

SUMMARY OF THE INVENTION

According to one aspect of the invention, a drive assembly is provided for translating rotational motion into linear motion. The drive assembly includes a threaded screw and a gear that is rotatably disposed about the threaded screw. The gear includes a geared outer surface. The drive assembly also includes a housing having a bore and an opening in a lower surface of the housing. A rotatably driven worm is disposed within the bore of the housing. The worm includes a threaded outer surface that protrudes through the opening in the lower surface of the housing and which threadably engages the geared outer surface of the gear. A generally U-shaped retainer strap partially surrounds the gear and is adapted to couple the housing and the gear together to align and preload the worm and the gear.

According to another aspect of the invention, an adjustment mechanism is arranged between a movable member and a fixed member for moving the movable member relative to the fixed member. The adjustment mechanism includes a threaded screw fixedly secured to the fixed member and a gear that is rotatably disposed about the threaded screw. The gear includes a geared outer surface. The adjustment mechanism also includes a housing having a bore and an opening in a lower surface of the housing. A rotatably driven worm is disposed within the bore of the housing. The worm includes a threaded outer surface that protrudes through the opening in the lower surface of the housing and which threadably engages the geared outer surface of the gear. The adjustment mechanism further includes a generally U-shaped retainer strap and a generally U-shaped bracket. The retainer strap partially surrounds the gear and is adapted to couple the housing and gear together to align and preload the worm and the gear. The bracket is adapted to be fixedly secured to the movable member and the gear, housing, worm, and retainer strap are disposed within the bracket while the threaded screw passes through a pair of openings in the bracket.

According to yet another aspect of the invention, a power seat track assembly is provided for moving a seat fore and aft. A fixed track is adapted to be mounted to the floor and a movable track slidably engages the fixed track. A threaded screw is fixedly secured to the fixed track. A gear is rotatably disposed about the threaded screw and the gear includes a geared outer surface. A housing includes a bore and a lower arcuate surface having an opening therethrough. A worm is rotatably disposed within the bore of the housing and extends between a bearing end and a driven end. The worm includes a threaded outer surface that protrudes through the opening in the lower arcuate surface of the housing and threadably engages the geared outer surface of the gear. A generally U-shaped retainer strap partially surrounds the gear and is adapted to couple the housing and gear together to align and preload the worm and the gear. A generally U-shaped bracket is adapted to be fixedly secured to the movable track. The gear, housing, worm, and retainer strap are disposed within the bracket and the threaded screw passes through a pair of openings in the bracket. A drive is operatively coupled to the driven end of the worm such that rotation of the worm causes the gear to rotate and travel along the threaded screw which urges the bracket and therefore the movable track fore and aft.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 15 is a fragmentary, cross-sectional end view of the seat track and a drive assembly including a soft wave washer according to a sixth embodiment of the invention;

FIG. 16 is an exploded, perspective view of a worm sub-assembly including a housing, a worm, and an end plug for use with a seventh embodiment of the invention;

DETAILED DESCRIPTION OF THE PREFERRED EMBODIMENTS

Figure 1:
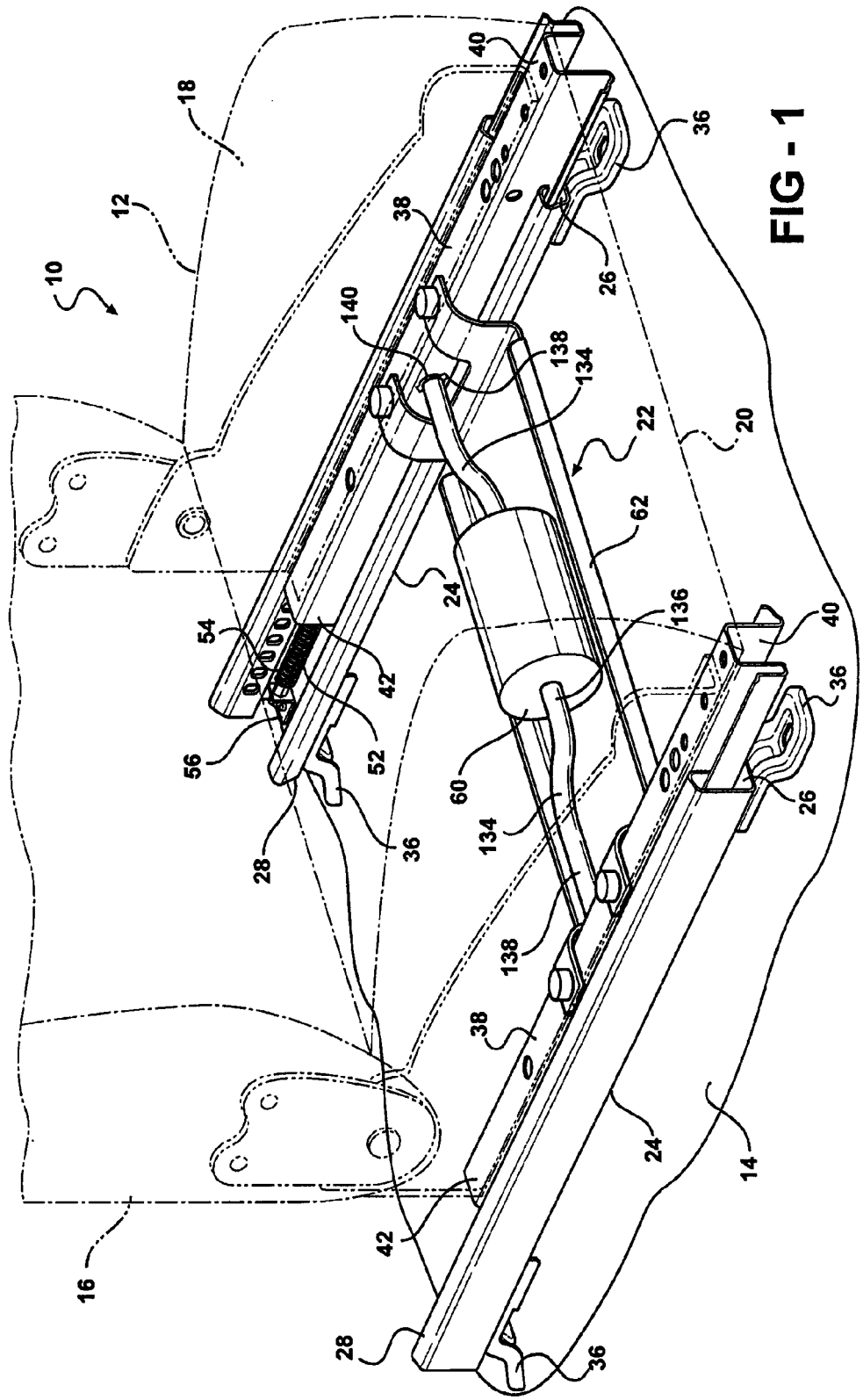
FIG. 1 is a fragmentary, perspective view of a seat assembly including a power seat track assembly.

Referring to FIG. 1, a seat assembly for an automotive vehicle is generally shown at 10. The seat assembly 10 includes a generally horizontal seat cushion 12 for supporting a seat occupant above a floor 14 of the vehicle and a generally upright seat back 16. The seat cushion 12 includes a seating surface 18 and a bottom surface 20 opposite thereto. A power seat track assembly, generally indicated at 22, is positioned between the bottom surface 20 of the seat cushion 12 and the floor 14 of the vehicle. The seat track assembly 22 provides fore and aft adjustment of the seat assembly 10 within the vehicle.

Referring to FIGS. 1, 2, 4, and 5, the seat track assembly 22 includes a pair of laterally spaced apart seat tracks. Each seat track includes a lower track 24 extending longitudinally between fore 26 and aft 28 ends. Each lower track 24 has a generally U-shaped cross-section defined by a horizontal lower wall 30 extending between spaced apart outer side walls 32, 34. A foot 36 is fixedly secured to each of the fore 26 and aft 28 ends of the lower track 24 and is adapted to mount the lower track 24 to the floor 14 of the vehicle. Each seat track also includes an upper track 38 slidably engaging the lower track 24 and extending longitudinally between fore 40 and aft 42 ends. Each upper track 38 has an inverted, generally U-shaped cross-section defined by a horizontal upper wall 44 spaced apart from the lower wall 30 of the lower track 24 and extending between spaced apart inner side walls 46, 48. The upper track 38 is slidably movable relative to the lower track 24 and fits into the lower track 24 such that their inward and/or outward bent marginal areas form a closed track profile.

Figure 2:
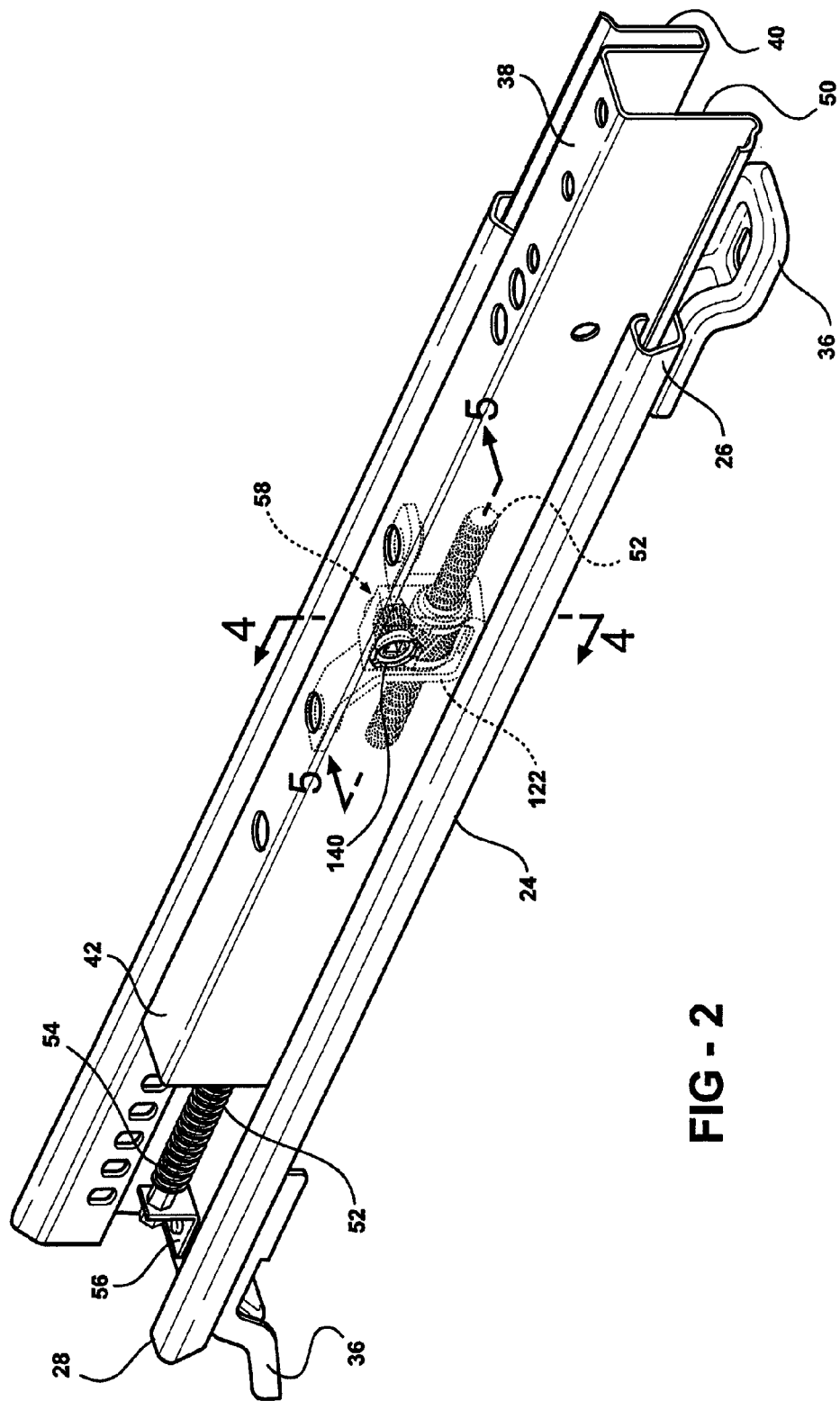
FIG. 2 is a perspective view of a seat track including a drive assembly according to the invention.
Figure 3:
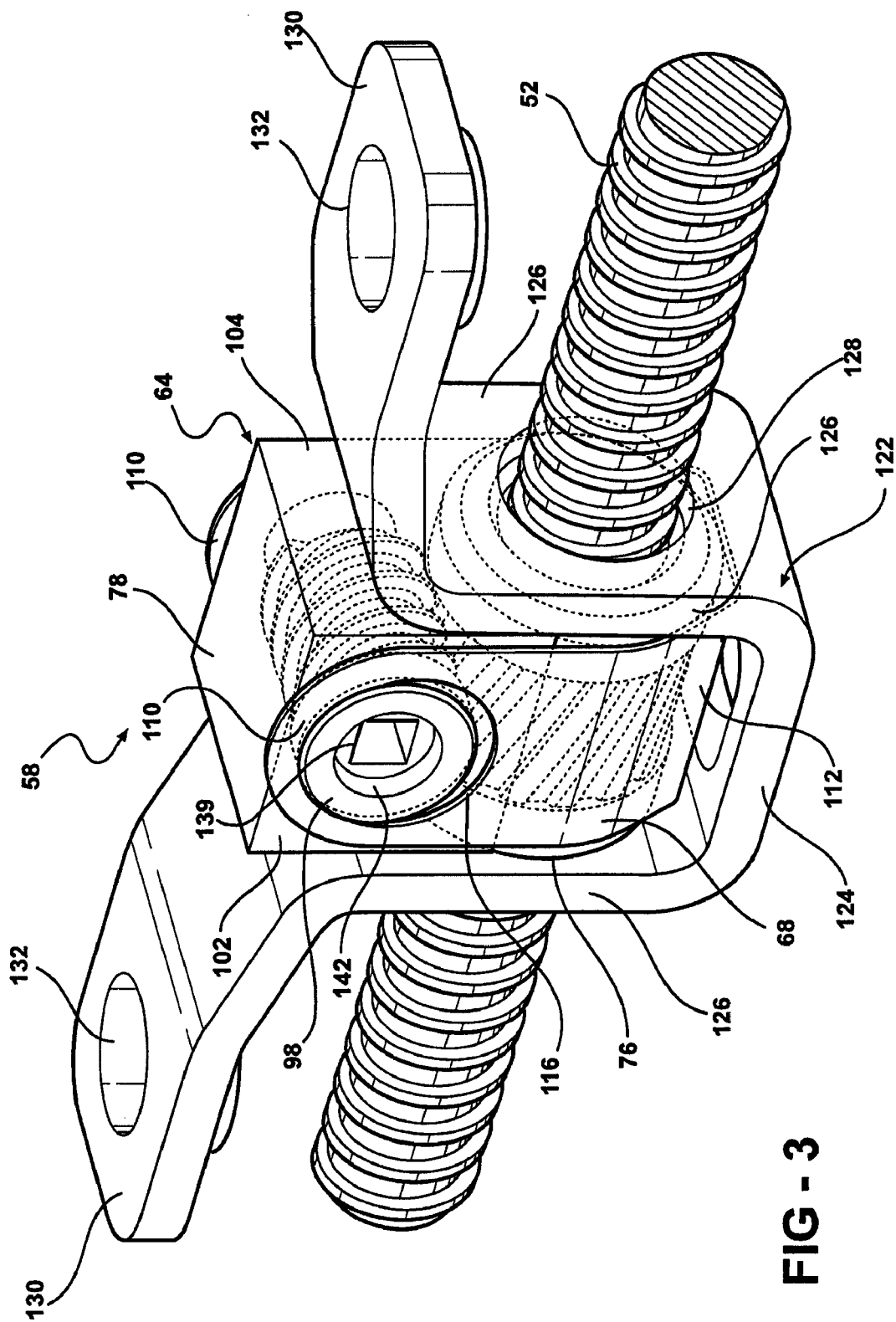
FIG. 3 is a perspective view of the drive assembly operatively coupled to a lead screw and surrounded by a generally U-shaped bracket.
Figure 4:
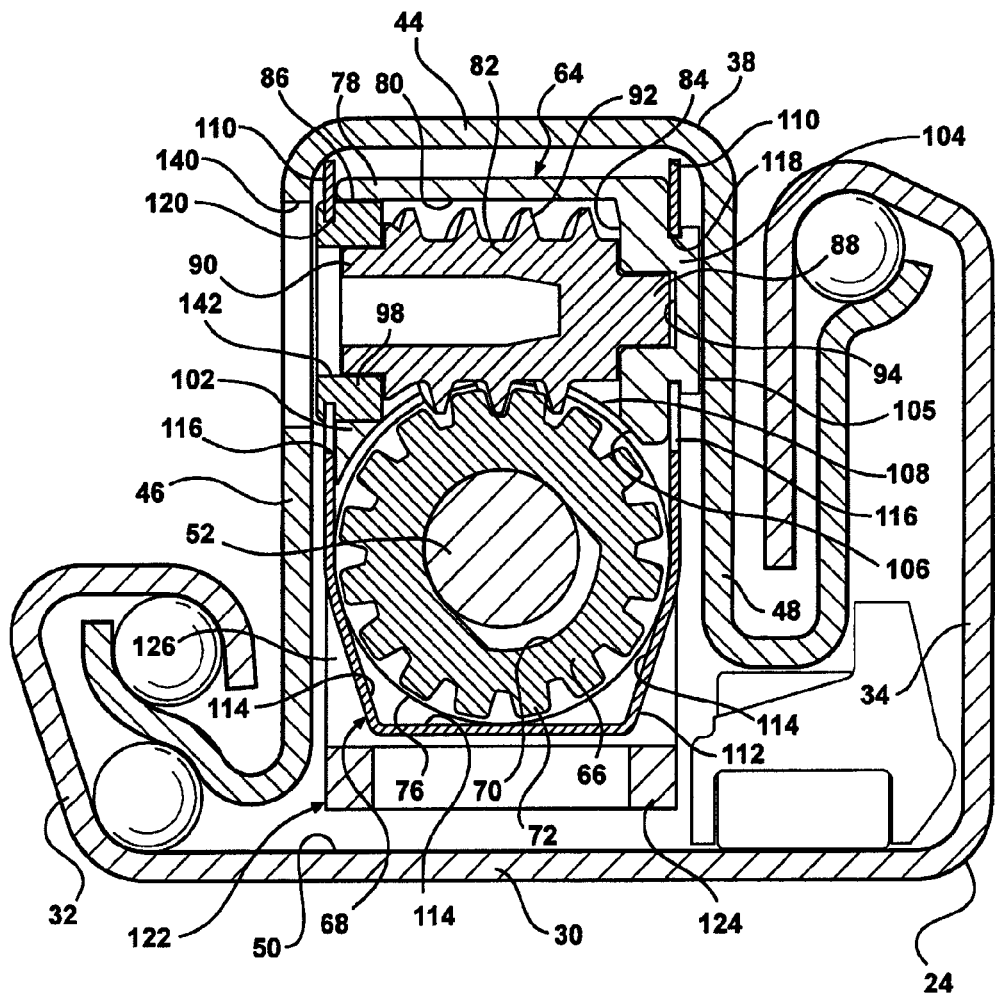
FIG. 4 is a cross-section taken along lines 4-4 in FIG. 2.
Figure 5:
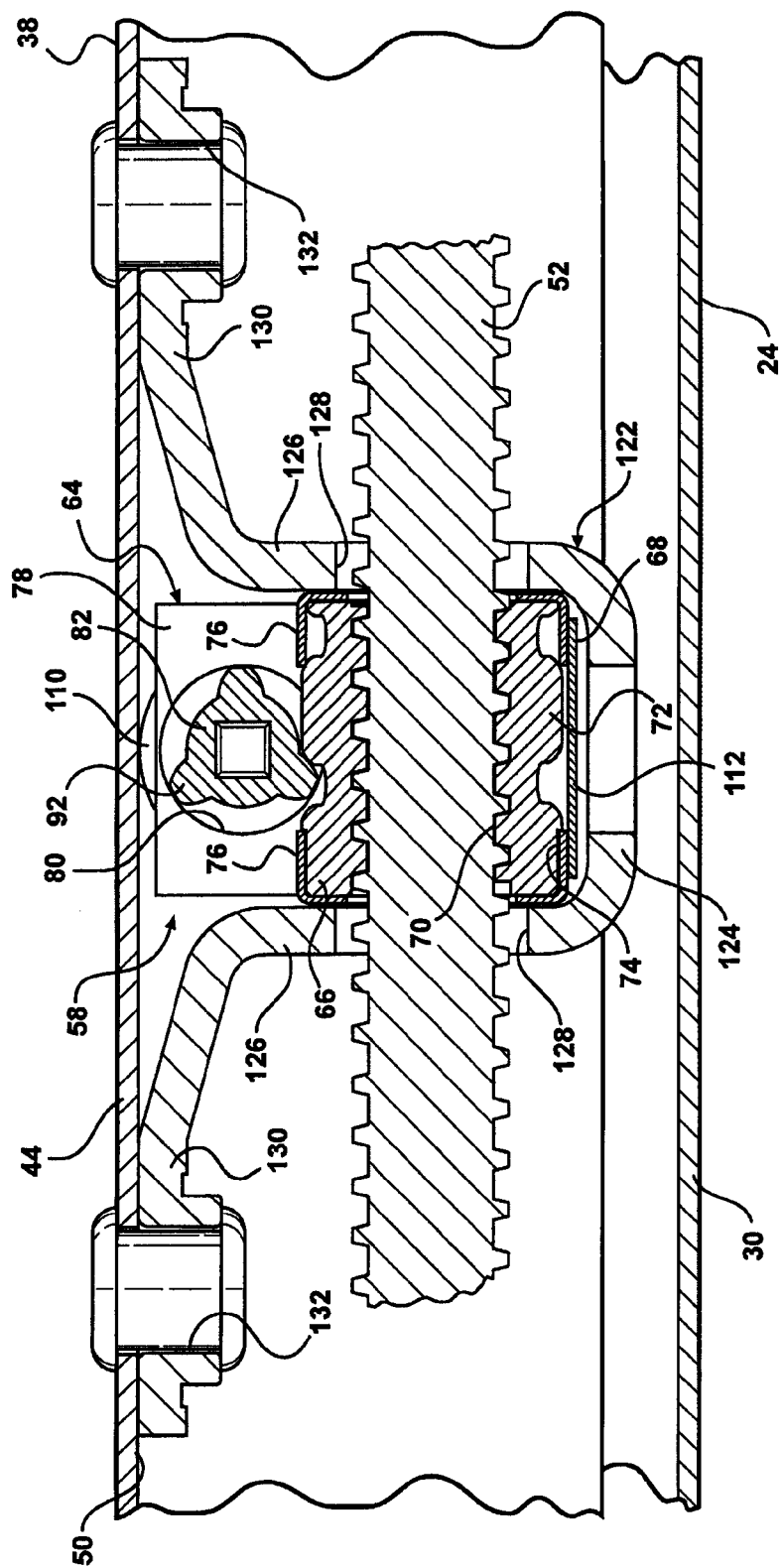
FIG. 5 is a cross-section taken along lines 5-5 in FIG. 2.
Figure 6:
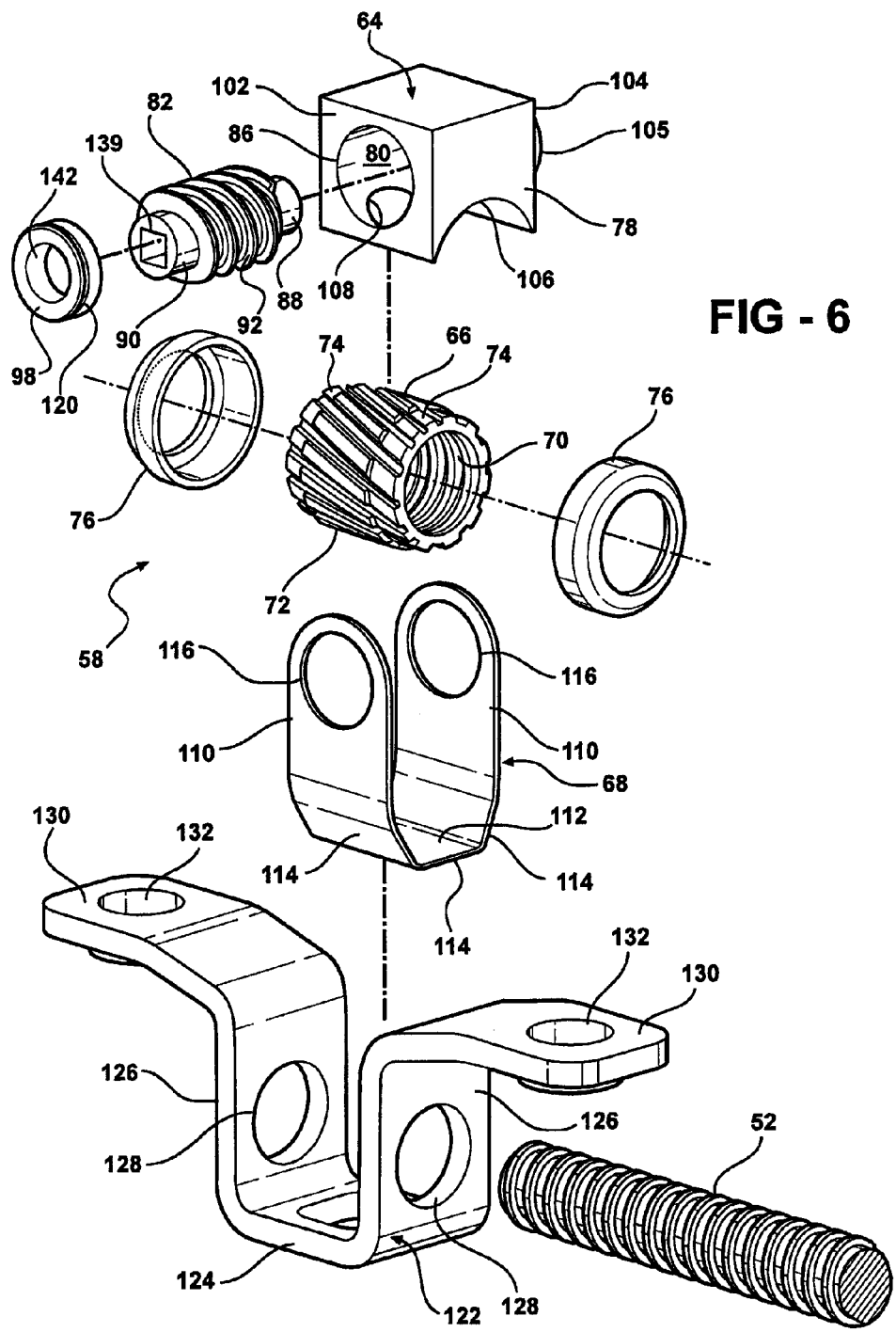
FIG. 6 is an exploded view of FIG. 3.

The lower 24 and upper 38 tracks define a channel 50 extending longitudinally therebetween. The channel 50 extends vertically between the lower wall 30 of the lower track 24 and the upper wall 44 of the upper track 38. In addition, the channel 50 extends laterally between the inner side walls 46, 48 of the upper track 38. A horizontal lead screw 52 is disposed longitudinally within the channel 50 and extends between a first end (not shown) and a second end 54. The first and second 54 ends of the lead screw 52 are fixedly secured to the lower track 24 at the respective fore 26 and aft 28 ends by L-shaped brackets 56. A gearbox or drive assembly, generally shown at 58, is disposed within the channel 50 and is operatively coupled between the lead screw 52 and the upper track 38, as shown in FIGS. 2 and 5. The drive assembly 58 drives the upper track 38 linearly fore and aft relative to the lower track 24 in response to rotary input by an electric motor 60 mounted to a bracket 62 extending laterally between the upper tracks 38 of the pair of seat tracks.

Referring to FIGS. 3 through 7, the drive assembly 58 includes a worm sub-assembly, generally indicated at 64, a worm wheel or gear 66, and a retainer strap 68 for coupling the worm sub-assembly 64 and gear 66 together. The gear 66 is disposed about the horizontal lead screw 52 and includes a threaded internal bore 70 and a geared outer surface 72. The internal bore 70 threadably receives the lead screw 52 therethrough. Each end of the gear 66 includes a recessed lip 74 extending circumferentially therearound for receiving a Teflon bushing 76, the purpose of which will become apparent below. It is appreciated that the recessed lip 74 at each end of the gear 66 increases the surface area of the geared outer surface 72 to provide a larger engagement surface with the bushings 76.

Figure 7:
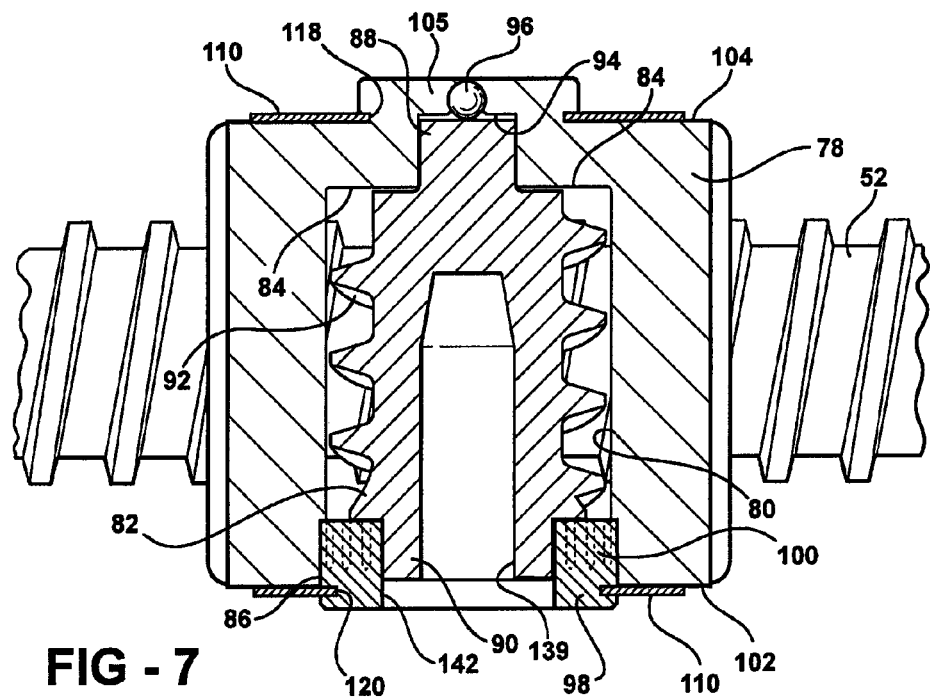
FIG. 7 is a cross-sectional top view of the drive assembly.

The worm sub-assembly 64 includes a generally cube-shaped housing 78 having an interior compartment or bore 80 for rotatably supporting a worm 82 therein. The bore 80 extends between a closed end 84 and an opposing open end 86. The worm 82 extends between a bearing end 88 and a drive end 90, and includes a helically threaded outer surface 92. A recess 94 at the closed end 84 of the bore 80 receives the bearing end 88 of the worm 82. It is appreciated that a ball bearing 96 may be rotatably disposed within the recess 94, as shown in FIG. 7, for reducing rotational friction between the bearing end 88 of the worm 82 and the housing 78.

Figure 13:
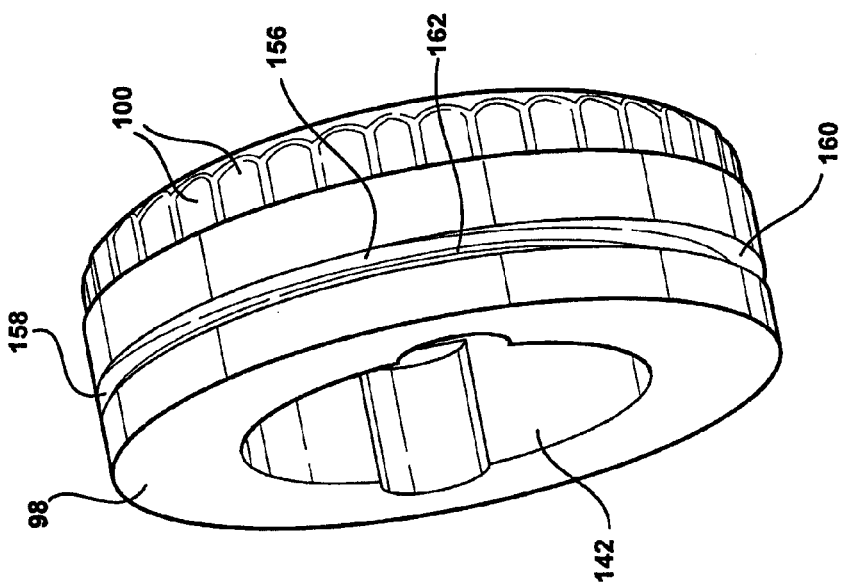
FIG. 13 is an enlarged perspective view of an end plug with an eccentric annular groove for use with a fifth embodiment of the invention.

An end plug 98 is inserted into the open end 86 of the bore 80 to act as a bearing or bushing between the drive end 90 of the worm 82 and the housing 78. The end plug 98 retains the worm 82 in the bore 80 of the housing 78. It is appreciated that an outer circumference of the end plug 98 may include a plurality of serrations 100, as shown in FIGS. 7 and 13, for engagement with a plurality of serrations (not shown) disposed around an inner circumference of the bore 80 at the open end 86. The serrations 100 act as mild detents to retain the end plug 98 therein.

The housing 78 is oriented such that the worm 82 is perpendicular to the gear 66. The housing 78 extends laterally between an inboard side 102 and an outboard side 104. The housing 78 includes an arcuate lower surface or downwardly facing concave surface 106 which slidably engages the bushings 76 at each end of the gear 66. The arcuate lower surface 106 includes an opening 108 therethrough allowing the helically threaded outer surface 92 of the worm 82 to threadingly engage the geared outer surface 72 of the gear 66.

The retainer strap 68 aligns and couples the worm subassembly 64 and gear 66 together, and sets a vertical preload between the worm 82 and the gear 66. The retainer strap 68 consists of a pair of horizontally spaced apart upright portions 110 connected by a generally U-shaped lower portion 112. In the embodiment shown, the lower portion 112 is made up of three flat segments 114 and partially surrounds the gear 66 and bushings 76 such that the bushings 76 slidably engage the retainer strap 68. The flat segments 114 minimize the contact between the retainer strap 68 and the bushings 76 to three points, allowing for smooth rotation of the gear 66 within the retainer strap 68. Each upright portion 110 of the retainer strap 68 includes a hole 116 which engages or locks into one of a first annular groove 118 in the housing 78 or a second annular groove 120 in the end plug 98. More specifically, the first annular groove 118 is formed in a protrusion 105 extending from the outboard side 104 of the housing 78 and is engaged by the hole 116 in the corresponding outboard, upright portion 110 of the retainer strap 68. The second annular groove 120 is formed in a portion of the end plug 98 protruding from the inboard side 102 of the housing 78 and is engaged by the hole 116 in the corresponding inboard, upright portion 110 of the retainer strap 68.

It is appreciated that the maximum distance between the center line of the worm 82 and the center line of the gear 66, and thus, the maximum vertical preload between the worm 82 and gear 66 is set by the retainer strap 68. Therefore, the maximum vertical preload between the worm 82 and gear 66 can be adjusted by changing the location of the holes 116 in the retainer strap 68. However, there must always be some backlash between the worm 82 and the gear 66. Therefore, the minimum distance between the center line of the worm 82 and the center line of the gear 66, and thus, the minimum vertical preload between the worm 82 and gear 66 is set by the contact between the arcuate lower surface 106 of the housing 78 and the bushings 76 at each end of the gear 66.

A U-shaped bracket 122 is adapted to surround the drive assembly 58 and transfer fore and aft movement of the drive assembly 58 to the upper track 38. More specifically, the bracket 122 includes a base 124 and two spaced apart sides 126 between which the drive assembly 58 is located. Each side 126 has a circular opening 128 for allowing the lead screw 52 to pass therethrough. A flange 130 projects outwardly from each side 126 and is disposed perpendicular thereto. Each flange 130 includes an aperture 132 to fixedly secure the bracket 122 to the upper wall 44 of the upper track 38 by use of a bolt, screw, rivet or other attachment means. In the event of a crash the bracket 122 deforms in the manner of a parallelogram such that the circular openings 128 move into engagement with and jam against the lead screw 52 to prevent the seat assembly 10 from moving fore or aft.

Referring to FIG. 1, a flexible drive shaft 134 as is well known in the art extends between the motor 60 and the drive assembly 58. More specifically, the drive shaft 134 is operatively coupled at a first end 136 to the motor 60 and at a second end 138 to the drive end 90 of the worm 82. The second end 138 of the drive shaft 134 passes through an aperture 140 in the upper track 38 and a central hole 142 in the end plug 98 to engage a recess 139 in the drive end 90 of the worm 82. Operation of the motor 60 turns the drive shaft 134 in either a first or second direction which creates a torque input to the worm 82, thereby causing the worm 82 to rotate in the first or second direction. Rotation of the worm 82 drives the gear 66 which rotates and pulls itself along the lead screw 52 in either a fore or aft direction. The fore and aft movement of the gear 66 in turn moves the drive assembly 58, the bracket 122, the upper track 38, and thus the entire seat assembly 10 in the fore and aft directions.

Figure 8:
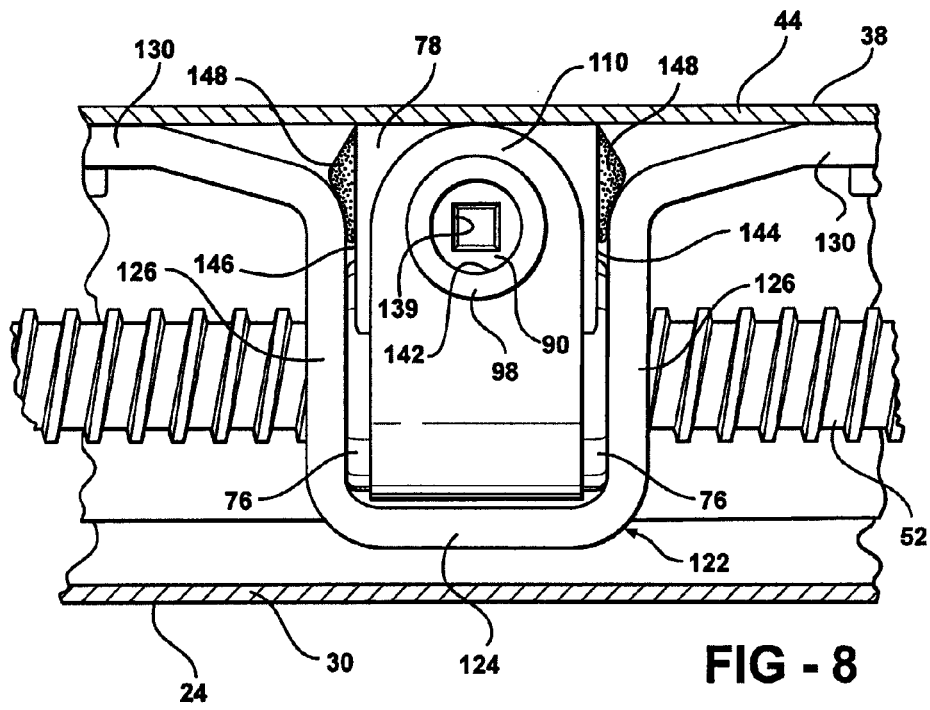
FIG. 8 is a fragmentary, partially cut-away side view of the seat track illustrating a drive assembly according to a second embodiment of the invention.

Referring to FIG. 8, in a second embodiment of the invention, opposite front 144 and rear 146 sides of the housing 78 are shown to include at least one outwardly extending crush rib 148. The crush ribs 148 compressingly deform upon engagement with the sides 126 of the bracket 122 to prevent clunk or longitudinal movement of the drive assembly 58 therebetween when the motor 60 reverses direction.

Figure 9:
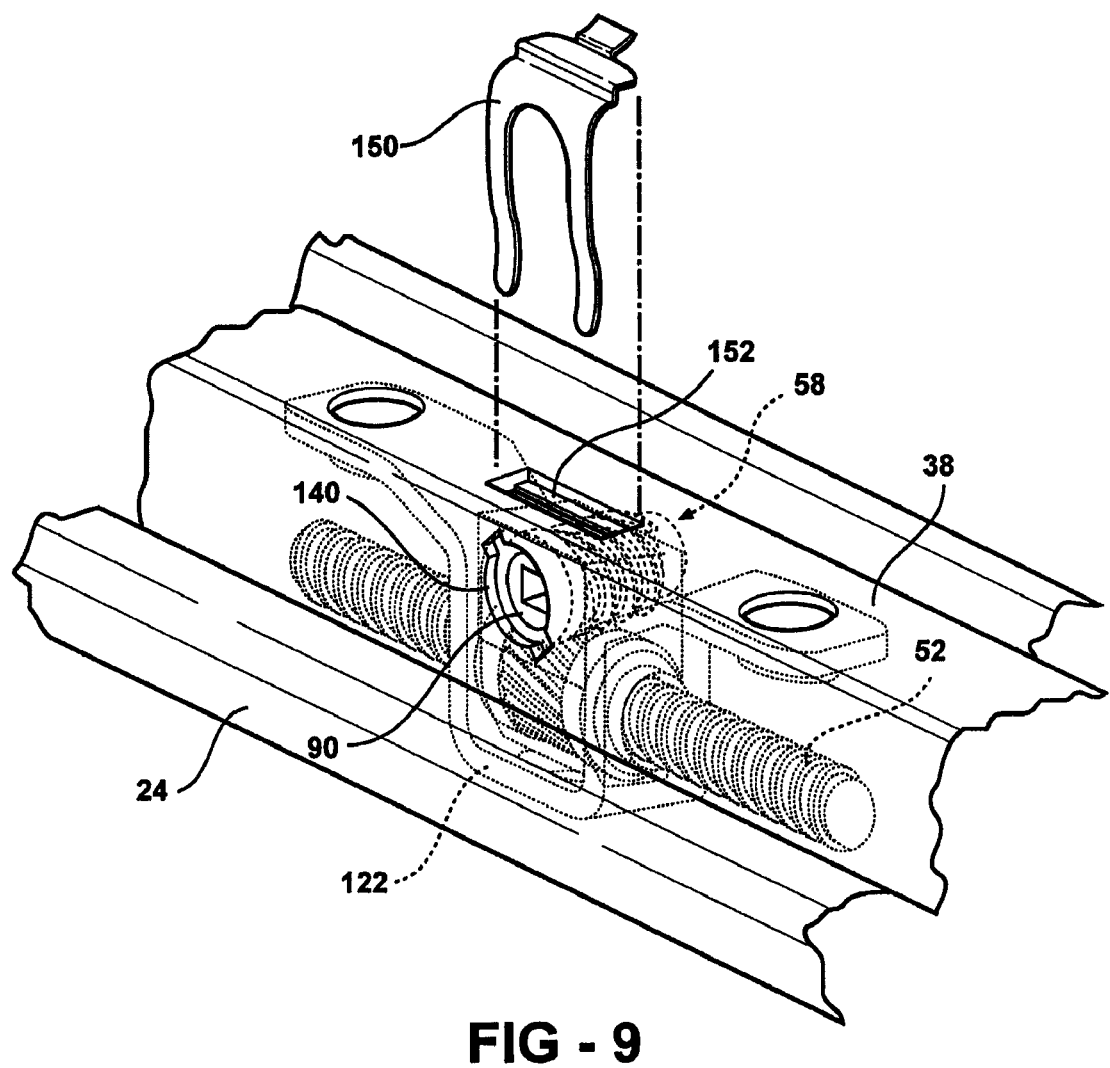
FIG. 9 is a fragmentary, partially exploded, perspective view of the seat track and a drive assembly including a U-shaped spring clip according to a third embodiment of the invention.
Figure 10:
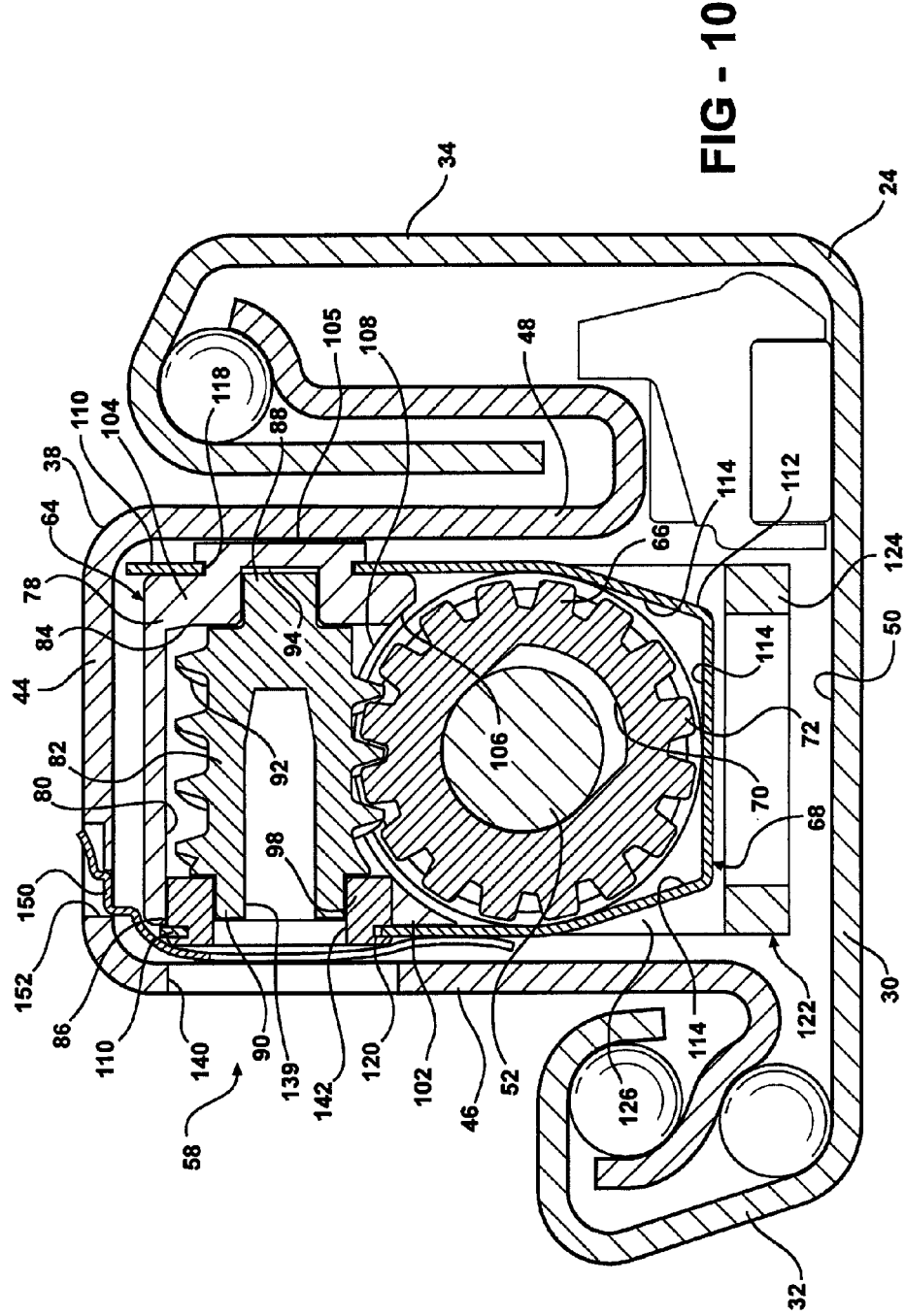
FIG. 10 is a cross-sectional end view of FIG. 9.

Referring to FIGS. 9 and 10, in a third embodiment of the invention, a generally U-shaped spring clip 150 is inserted through a slot 152 in the upper track 38 and is disposed between the inboard, inner side wall 46 of the upper track 38 and the end plug 98. The spring clip 150 axially preloads the worm 82 against the gear 66 while also ensuring that the drive assembly 58 is snug laterally between the inner walls 46, 48 of the upper track 38. In addition, the spring clip 150 prevents lateral clunk or lateral movement of the drive assembly 58 between the inner walls 46, 48 of the upper track 38 when the motor 60 reverses direction.

Figure 11:
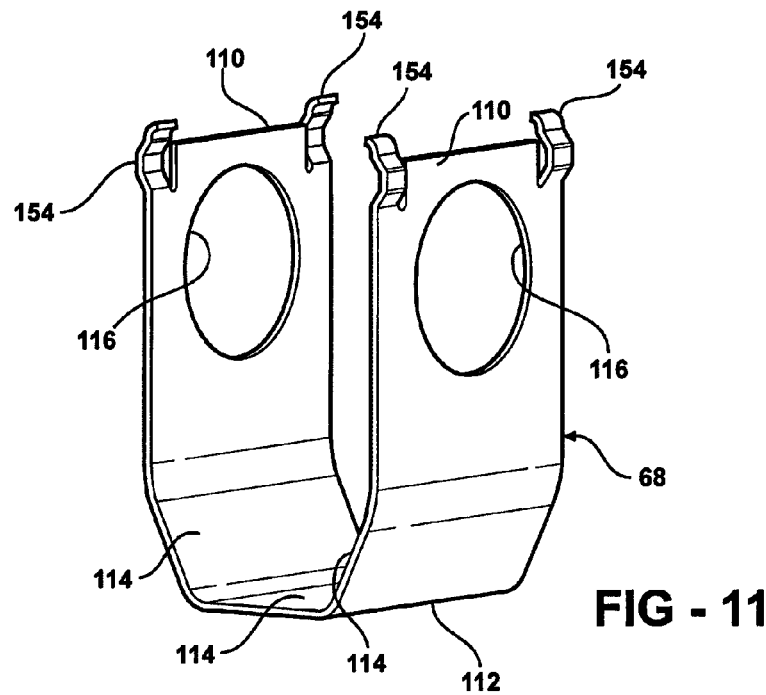
FIG. 11 is a perspective view of a retainer strap for use with a fourth embodiment of the invention.
Figure 12:
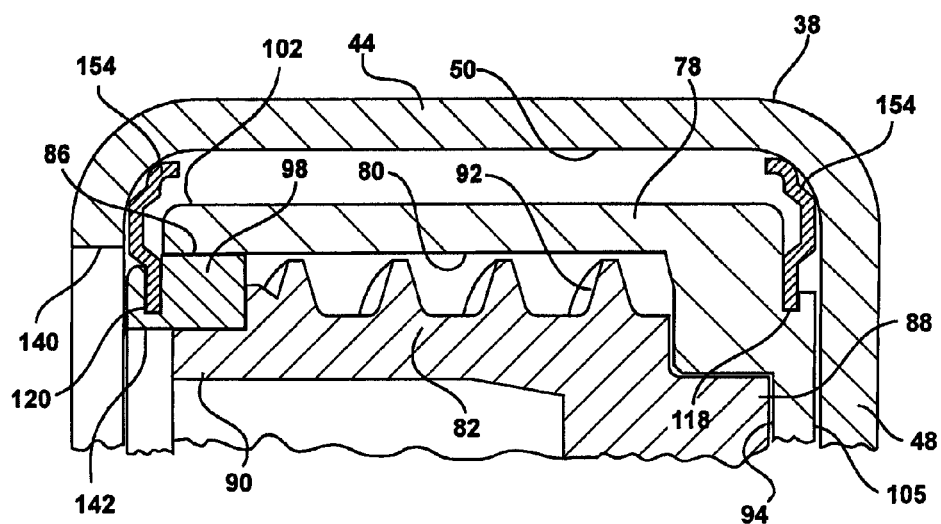
FIG. 12 is a fragmentary, cross-sectional end view of the seat track and drive assembly incorporating the retainer strap of FIG. 11.

Referring to FIGS. 11 and 12, in a fourth embodiment of the invention, each upright portion 110 of the retainer strap 68 includes a pair of preformed anti-rattle ears 154 extending generally upwardly therefrom. The ears 154 deflect upon contact with the inner side walls 46, 48 and/or the upper wall 44 of the upper track 38 to prevent lateral and upward movement of the drive assembly 58 within the channel 50 during operation of the seat track assembly 22.

Figure 14:
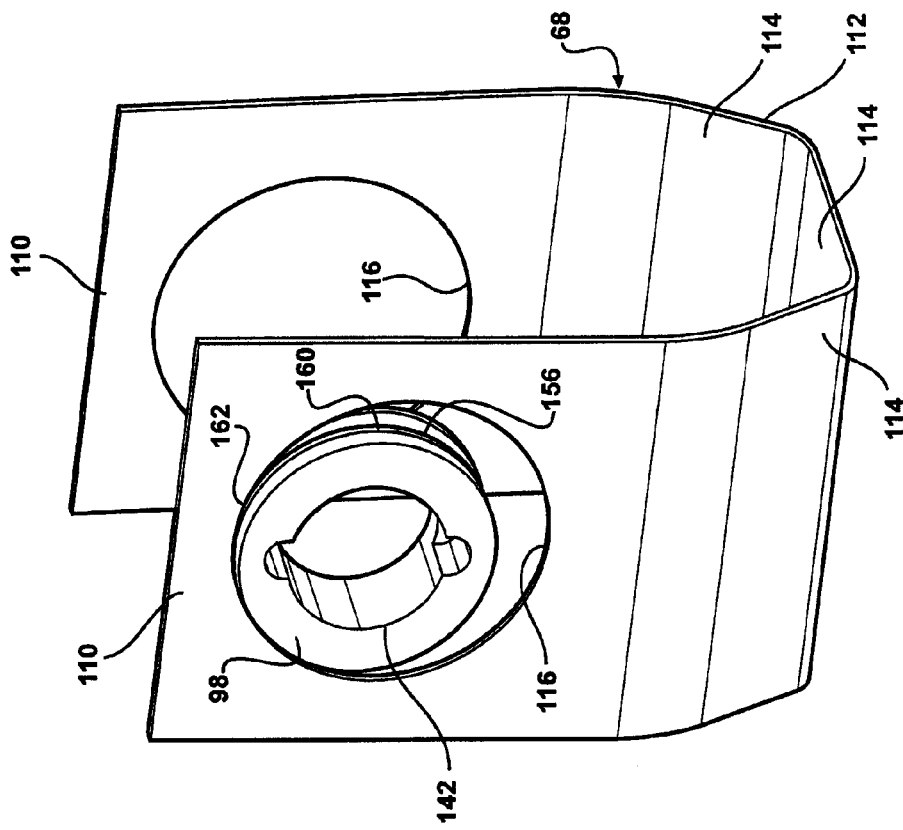
FIG. 14 is an enlarged perspective view of the retainer strap coupled to the end plug of FIG. 13.

Referring to FIGS. 13 and 14, in a fifth embodiment of the invention, the second annular groove 120 in the end plug 98 is replaced by an eccentric annular groove 156. The depth of the eccentric groove 156 varies around the circumference of the end plug 98 from a minimum depth 158 to a maximum depth 160. The hole 116 in the inboard, upright portion 110 of the retainer strap 68 engages or locks into the eccentric groove 156, and therefore, the eccentric groove 156 allows for increasing or decreasing the vertical preload between the worm 82 and the gear 66 by rotating the end plug 98.

When the drive assembly 58 is first assembled, the end plug 98 is oriented with a nominal depth 162 of the eccentric groove 156 facing generally upward, as shown in FIG. 14.

The nominal depth 162 is located between the minimum 158 and maximum 160 depths. If the vertical preload between the worm 82 and gear 66 is too small, i.e., the worm 82 and gear 66 are meshing too loosely, the end plug 98 can be rotated until the eccentric groove 156 is oriented with the minimum depth 158 facing upward. With the minimum depth 158 facing upward, the effective length of the retainer strap 68 is shortened. This decreases the maximum distance between the center line of the worm 82 and the center line of the gear 66 which in turn increases the vertical preload between the worm 82 and gear 66. On the other hand, if the vertical preload between the worm 82 and gear 66 is too large, i.e., the worm 82 and gear 66 are meshing too tightly, the end plug 98 can be rotated until the eccentric groove 156 is oriented with the maximum depth 160 facing upward. With the maximum depth 160 facing upward, the effective length of the retainer strap 68 is lengthened. This increases the maximum distance between the center line of the worm 82 and the center line of the gear 66 which in turn decreases the vertical preload between the worm 82 and gear 66. It is appreciated that the plurality of serrations 100 on the end plug 98 will prevent the end plug 98 from further rotation once a desired rotational position is selected.

Referring to FIG. 15, in a sixth embodiment of the invention, a soft wave washer 164 is disposed about the drive end 90 of the worm 82 and is located between the end plug 98 and a shoulder 166 extending circumferentially around the worm 82. The soft wave washer 164 axially preloads the worm 82 against the gear 66.

Figure 17:
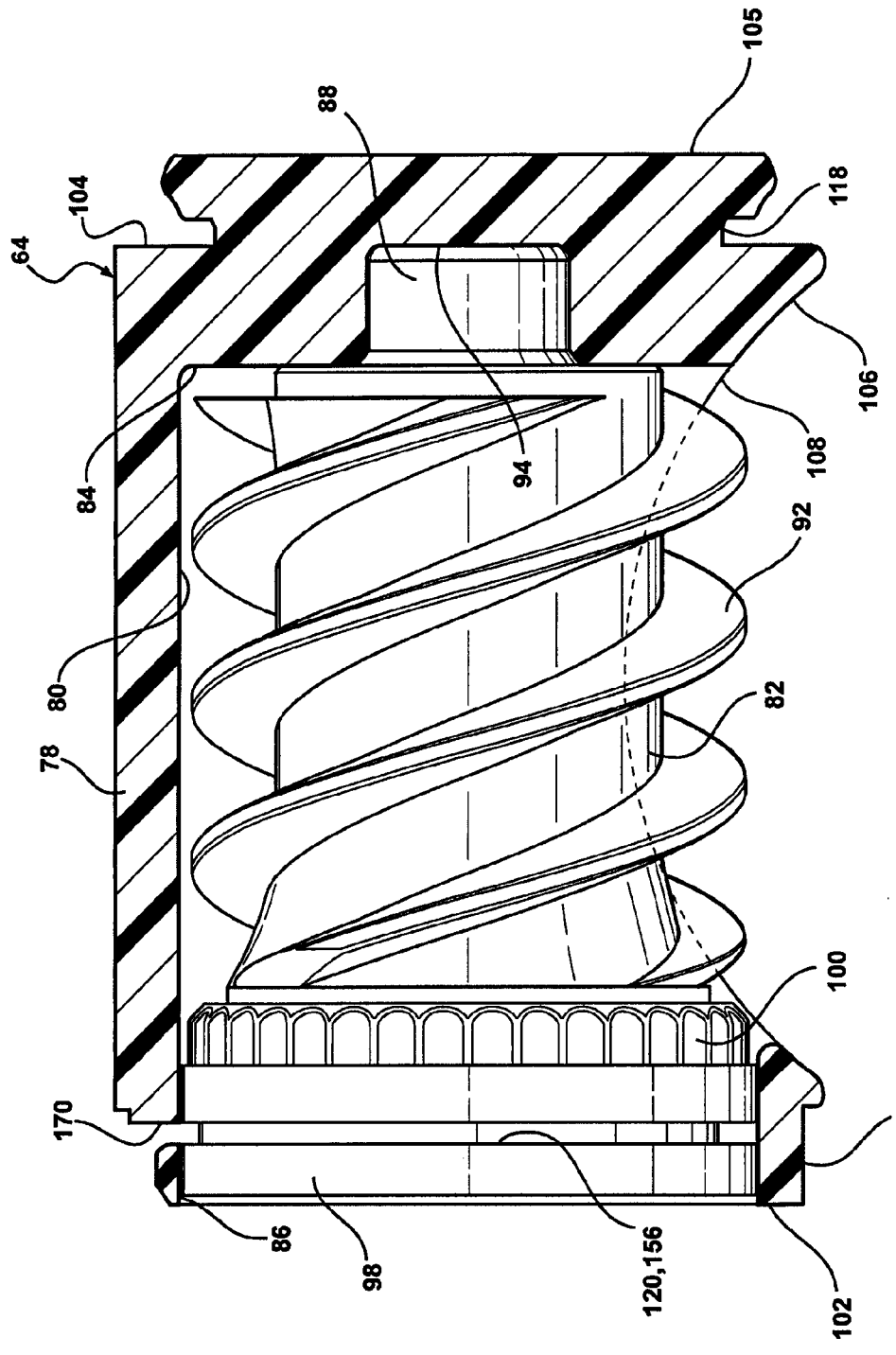
FIG. 17 is an enlarged, cross-sectional end view of the worm sub-assembly of FIG. 16.
Figure 18:
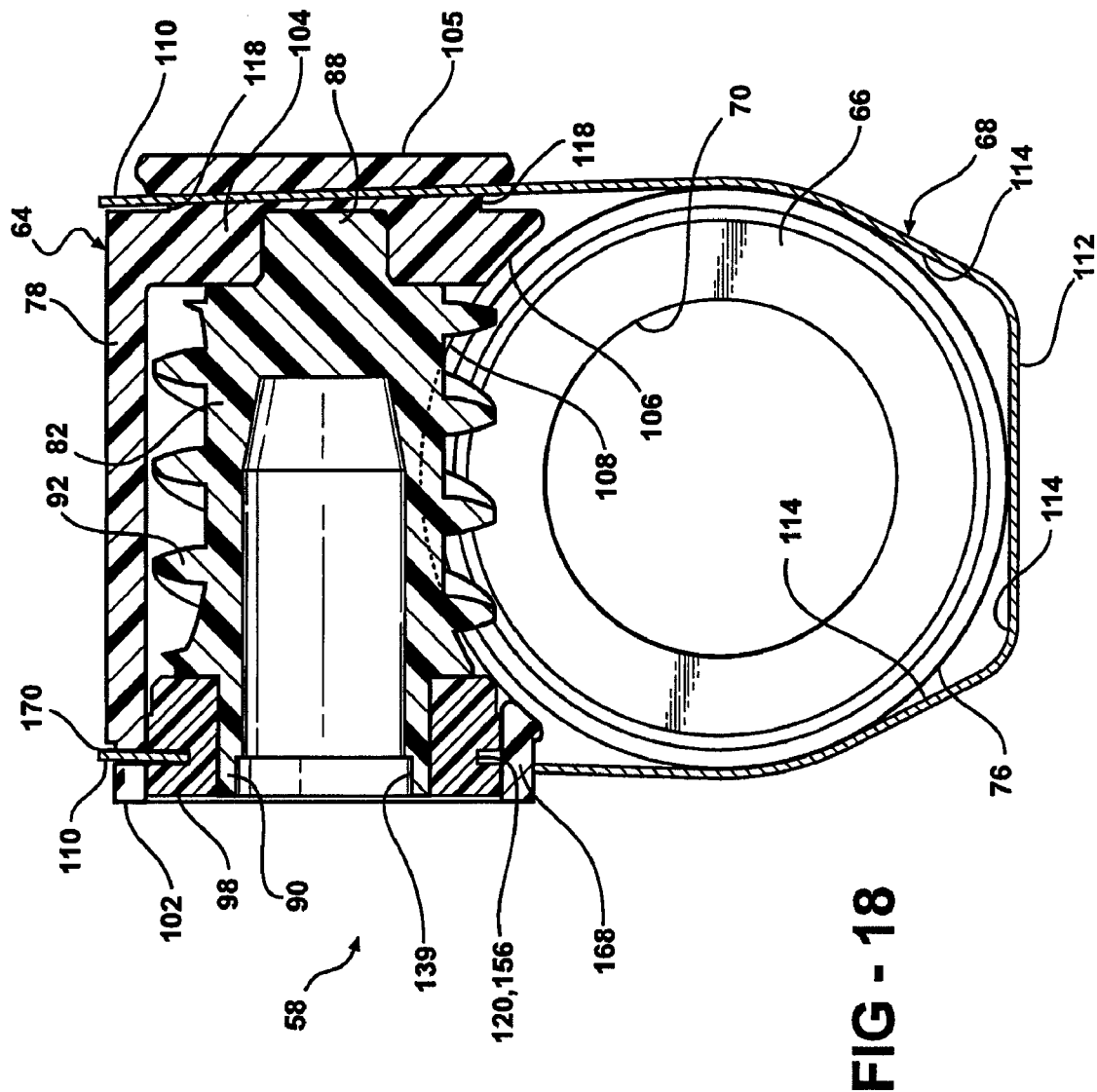
FIG. 18 is a cross-sectional end view of the drive assembly incorporating the worm sub-assembly of FIG. 17.
Figure 19:
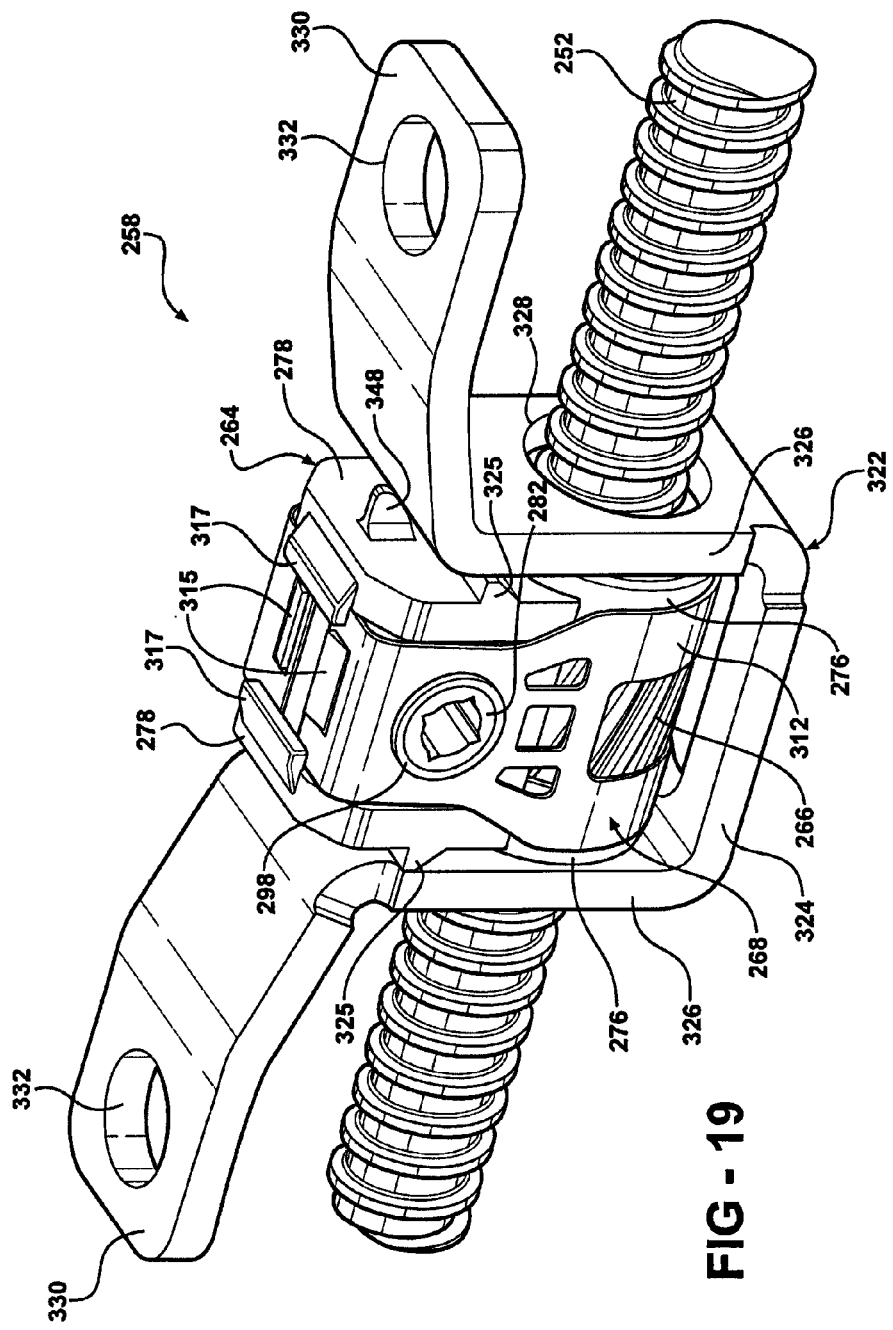
FIG. 19 is a perspective view of a drive assembly operatively coupled to a lead screw and surrounded by a generally U-shaped bracket according to an eighth embodiment of the invention.
Figure 20:
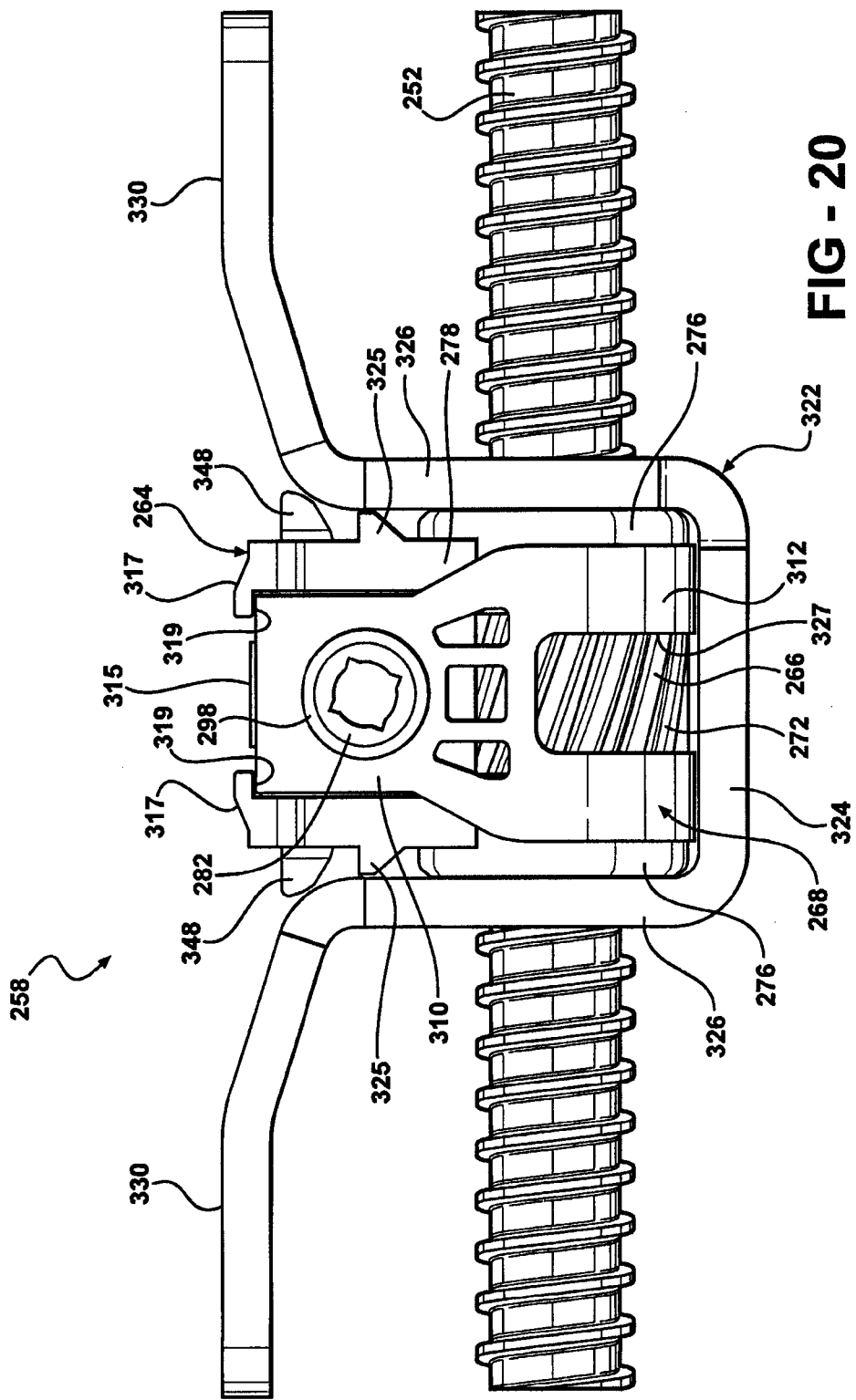
FIG. 20 is a side view of FIG. 19.
Figure 21:
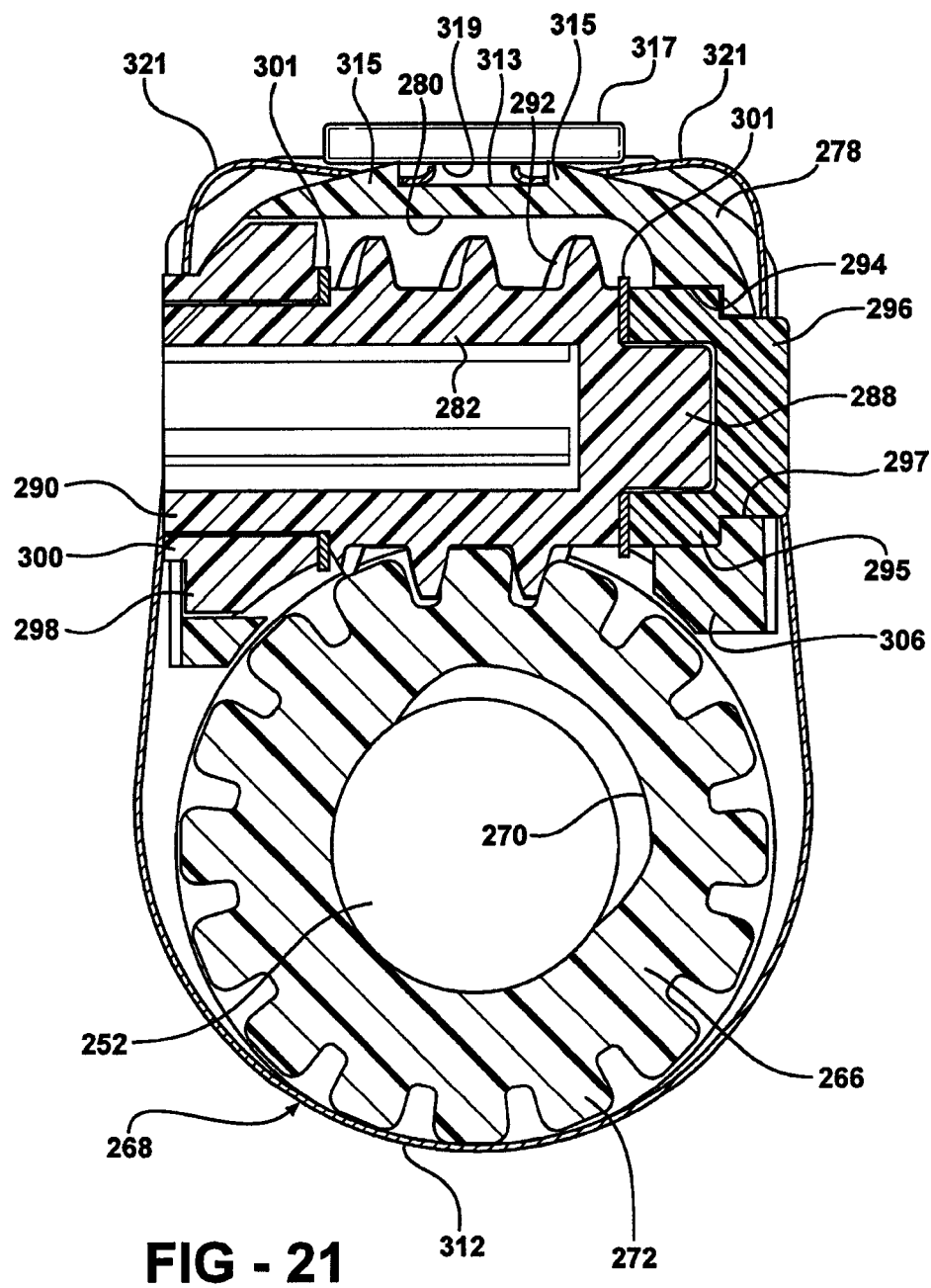
FIG. 21 is a cross-sectional end view of the drive assembly of FIG. 19.
Figure 22:
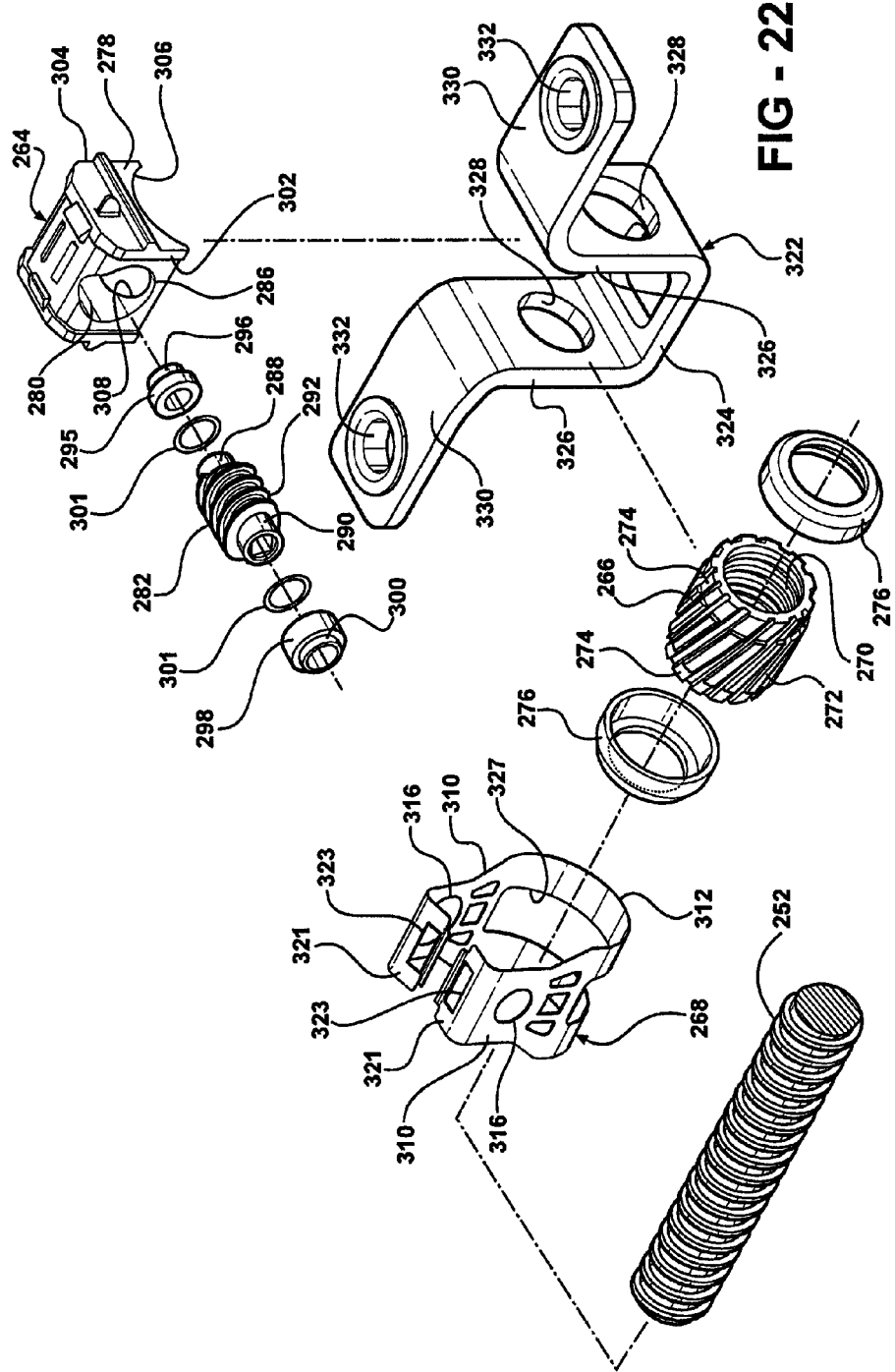
FIG. 22 is an exploded view of FIG. 19.

Referring to FIGS. 16 through 18, in a seventh embodiment of the invention, the inboard side 102 of the housing 78 is shown to include a collar 168 extending therefrom. The collar 168 includes an upper slot or opening 170 therethrough. The end plug 98 is inserted into the open end 86 of the bore 80 as described with respect to the first embodiment, however, the second annular groove 120 (or eccentric groove 156) is now laterally aligned with the opening 170 in the collar 168. The hole 116 in the inboard, upright portion 110 of the retainer strap 68 engages the second annular groove 120 (or eccentric groove 156) through the opening 170 in the collar. It is appreciated that with the retainer strap 68 engaging the second annular groove 120 (or eccentric groove 156) through the opening 170, the collar 168 will prevent the end plug 98 from backing out of the bore 80. It may be necessary to deflect the inboard, upright portion 110 of the retainer strap 68 inwardly to engage the second annular groove 120 (or eccentric groove 156). It is appreciated that this inward deflection will result in an axial end load on the worm 82, thereby axially preloading the worm 82 against the gear 66.

Referring to FIGS. 19 through 26, in an eighth embodiment of the invention, an alternative design of a drive assembly 258 is disclosed. The drive assembly 258 includes a worm sub-assembly, generally indicated at 264, a worm wheel or gear 266, and a retainer strap 268 for coupling the worm sub-assembly 264 and gear 266 together. The gear 266 is disposed about a horizontal lead screw 252 and includes a threaded internal bore 270 and a geared outer surface 272. The internal bore 270 threadably receives the lead screw 252 therethrough. Each end of the gear 266 includes a recessed lip 274 extending circumferentially therearound for receiving an acetal bushing 276, the purpose of which will become apparent below. It is appreciated that the recessed lip 274 at each end of the gear 266 increases the surface area of the geared outer surface 272 to provide a larger engagement surface with the bushings 276. Preferably, the gear 266 is made from a synthetic material, such as plastic.

The worm sub-assembly 264 includes a generally cube-shaped housing 278 having an interior compartment or bore 280 for rotatably supporting a worm 282 therein. The bore 280 extends between a partially closed end 284 and an opposing open end 286. The worm 282 extends between a bearing end 288 and a drive end 290, and includes a helically threaded outer surface 292. Preferably, the worm 282 is made from steel. A stepped recess 294 at the partially closed end 284 of the bore 280 receives a stepped bearing 295 for rotatably supporting the bearing end 288 of the worm 282. A stepped portion 296 of the stepped bearing 295 protrudes through an opening 297 in the partially closed end 284 of the bore 280, the purpose of which will become apparent below. Similarly, an end plug 298 is inserted into the open end 286 of the bore 280 to act as a bearing between the drive end 290 of the worm 282 and the housing 278. An outer circumference of the end plug 298 includes a pair of ears (not shown) extending outwardly therefrom. The ears are disposed in corresponding recesses 299 formed in the housing 278 to prevent the end plug 298 from rotating within the open end 286 of the bore 280. The end plug 298 also includes a stepped portion 300, the purpose of which will become apparent below. Preferably, the stepped bearing 295 and the end plug 298 are made from acetal. A washer 301 made from a hard material is disposed between the stepped bearing 295 and the worm 282, and the end plug 298 and the worm 282, to reduce wear of the acetal bearings 295, 298.

Figure 24:
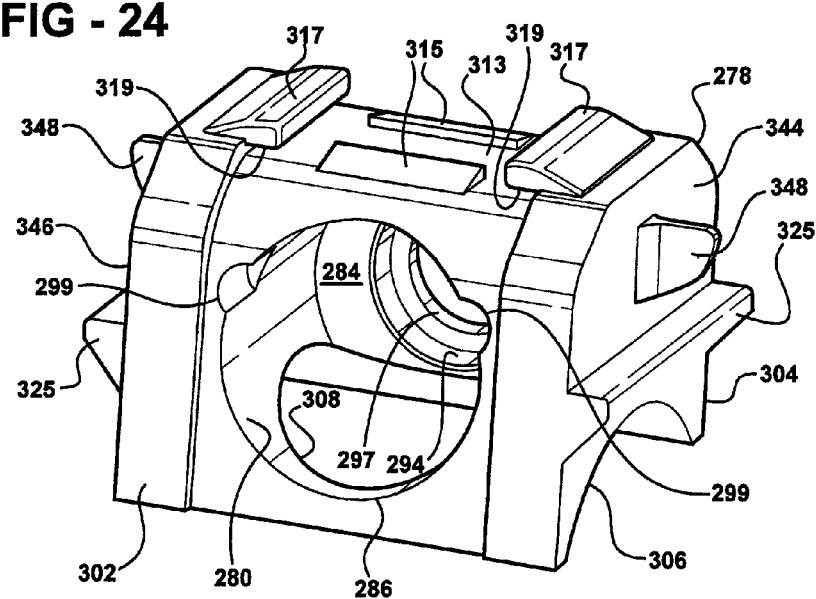
FIG. 24 is a perspective view of a housing for use with the drive assembly of FIG. 19.

The housing 278 is oriented such that the worm 282 is perpendicular to the gear 266. Referring to FIG. 24, the housing 278 extends laterally between an inboard side 302 and an outboard side 304. The housing 278 includes an arcuate lower surface or downwardly facing concave surface 306 which slidably engages the bushings 276 at each end of the gear 266. The arcuate lower surface 306 includes an opening 308 therethrough allowing the helically threaded outer surface 292 of the worm 282 to threadingly engage the geared outer surface 272 of the gear 266. An upper surface 313 of the housing 278 includes a pair of spaced apart and opposing locking tabs 315 for lockingly engaging the retainer strap 268 to couple the worm sub-assembly 264 and the gear 266 together. Each ramp-shaped locking tab 315 protrudes upwardly at an angle from the upper surface 313 as it extends toward a longitudinal center of the housing 278. Additionally, a pair of spaced apart flanges 317 extend laterally along the upper surface 313 adjacent respective front 344 and rear 346 sides of the housing 278. Each flange 317 defines an undercut 319, the purpose of which will become apparent below.

Figure 25:
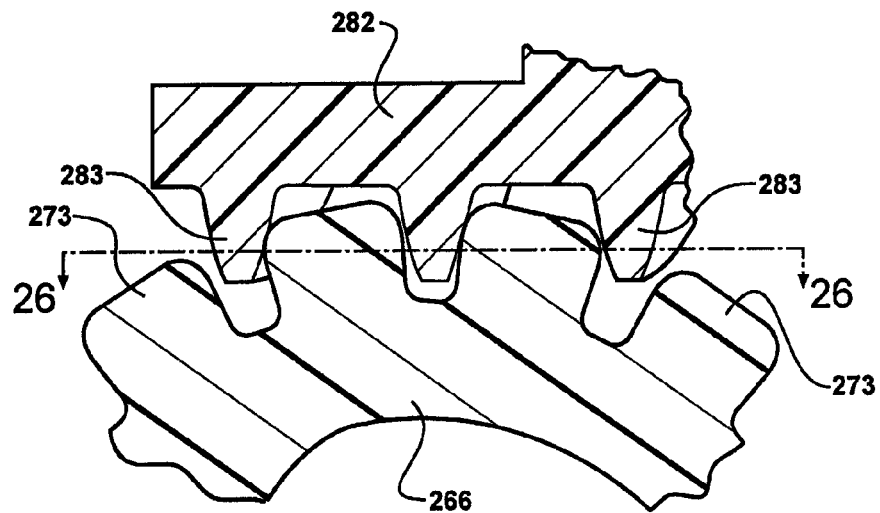
FIG. 25 is a fragmentary, cross-sectional end view of the drive assembly illustrating belly contact between worm teeth and gear teeth.
Figure 26:
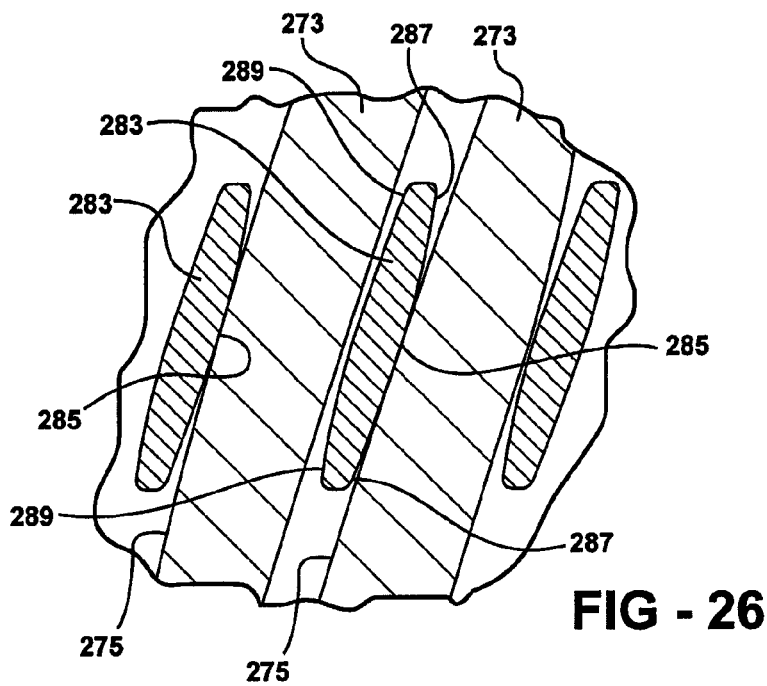
FIG. 26 is a cross-sectional view taken along lines 26-26 in FIG. 25.

Preferably, the threading engagement between the worm 282 and the gear 266 is characterized by "belly-to-belly" contact, as shown in FIGS. 25 and 26. More specifically, each worm tooth 283 is designed such that only a central face portion 285 contacts a face 275 of the corresponding gear tooth 273. To establish such "belly-to-belly" contact, leading 287 and trailing 289 edges of each worm tooth 283 are shaped to prevent the steel worm teeth 283 from slicing into the plastic gear teeth 273. Additionally, each worm tooth 283 is shortened so there is no tip to root contact between the worm teeth 283 and the gear teeth 273.

Figure 23:
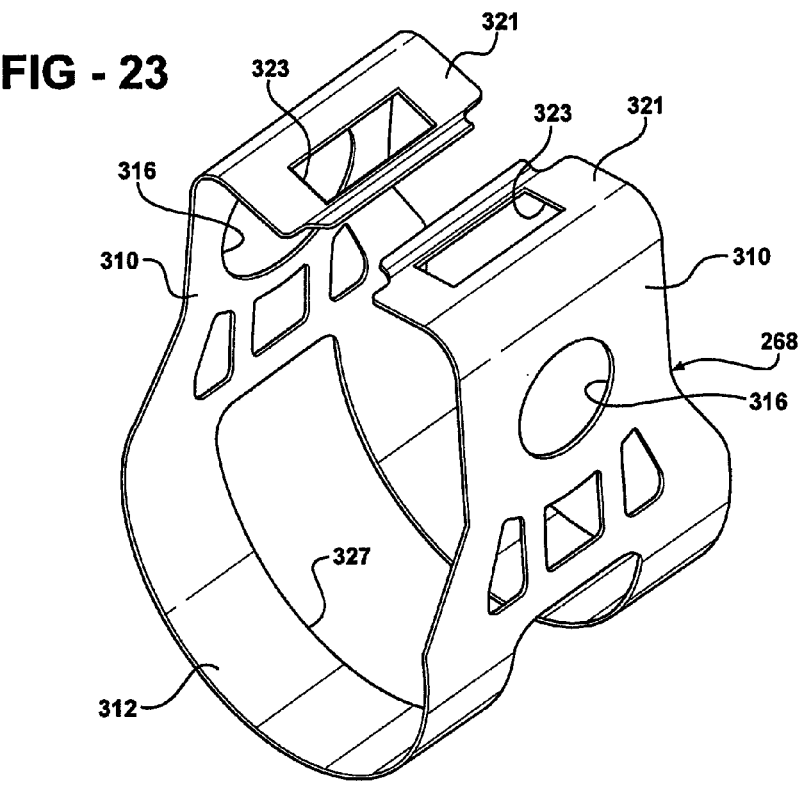
FIG. 23 is a perspective view of a generally U-shaped retainer strap for use with the drive assembly of FIG. 19.

The retainer strap 268 aligns and couples the worm sub-assembly 264 and the gear 266 together, and sets a vertical and axial preload between the worm 282 and the gear 266. Referring to FIG. 23, the retainer strap 268 consists of a pair of horizontally spaced apart upright portions 310 connected by a generally U-shaped lower portion 312 for partially surrounding the gear 266 and bushings 276. The bushings 276 slidably engage the lower portion 312 of the retainer strap 268. Each upright portion 310 of the retainer strap 268 includes a hole 316 which captures one of the stepped bearing 295 or the end plug 298 therein. More specifically, the stepped portion 296 of the stepped bearing 295, which protrudes from the outboard side 304 of the housing 278 is captured by the hole 316 in the corresponding outboard, upright portion 310 of the retainer strap 268. Similarly, the stepped portion 300 of the end plug 298, which protrudes from the inboard side 302 of the housing 278 is captured by the hole 316 in the corresponding inboard, upright portion 310 of the retainer strap 268. Thus, the retainer strap 268 captures both the stepped bearing 295 and the end plug 298. In the embodiment shown, the lower portion 312 of the retainer strap 268 includes a slot 327 therein. It is appreciated that the retainer strap 268 may have a degree of flexibility to absorb tolerances and defects (i.e., runout on the gear 266 or lead screw 252), thereby minimizing noise and vibration potential.

An upper end of each upright portion 310 of the retainer strap 268 includes an inwardly extending locking portion 321. Each locking portion 321 is disposed generally perpendicular to the respective upright portion 310 and includes a rectangular window 323 formed therein. Each window 323 lockingly engages one of the locking tabs 315 protruding from the upper surface 313 of the housing 278 to couple the worm sub-assembly 264 and the gear 266 together. More specifically, the upright portions 310 are deflected inward and the corresponding locking portions 321 are deflected upward to engage the windows 323 with the locking tabs 315 and retain the retainer strap 268 in the deflected position. Additionally, opposing edges of the locking portions 321 are disposed in the undercuts 319, which prevent the windows 323 from disengaging from the locking tabs 315.

The inward deflection of the upright portions 310 and the upward deflection of the locking portions 321 sets the vertical and axial preload between the worm 282 and the gear 266. It is appreciated that the maximum distance between the center line of the worm 282 and the center line of the gear 266, and thus, the maximum vertical preload between the worm 282 and gear 266 is set by the retainer strap 268. Therefore, the maximum vertical preload between the worm 282 and gear 266 can be adjusted by changing the location of the holes 316 in the retainer strap 268. However, there must always be some backlash between the worm 282 and the gear 266. Therefore, the minimum distance between the center line of the worm 282 and the center line of the gear 266, and thus, the minimum vertical preload between the worm 282 and gear 266 is set by the contact between the arcuate lower surface 306 of the housing 278 and the bushings 276 at each end of the gear 266.

Each of the front 344 and rear 346 sides of the housing 278 include an outwardly extending crush rib 348. The crush ribs 348 compressingly deform upon engagement with sides 326 of a bracket 322 to prevent clunk or longitudinal movement of the drive assembly 258 therebetween when a motor actuating the drive assembly 258 reverses direction. Each of the front 344 and rear 346 sides also include a laterally extending reinforcement rib 325 to keep the housing 278 centered between the sides 326 of the bracket 322. As previously disclosed with respect to the first embodiment, the bracket 322 further includes a base 324 extending between the sides 326. Each side 326 has a circular opening 328 for allowing the lead screw 252 to pass therethrough. A flange 330 projects outwardly from each side 326 and is disposed perpendicular thereto. Each flange 330 includes an aperture 332 to fixedly secure the bracket 322 to an upper track by use of a bolt, screw, rivet or other attachment means.

Figure 27:
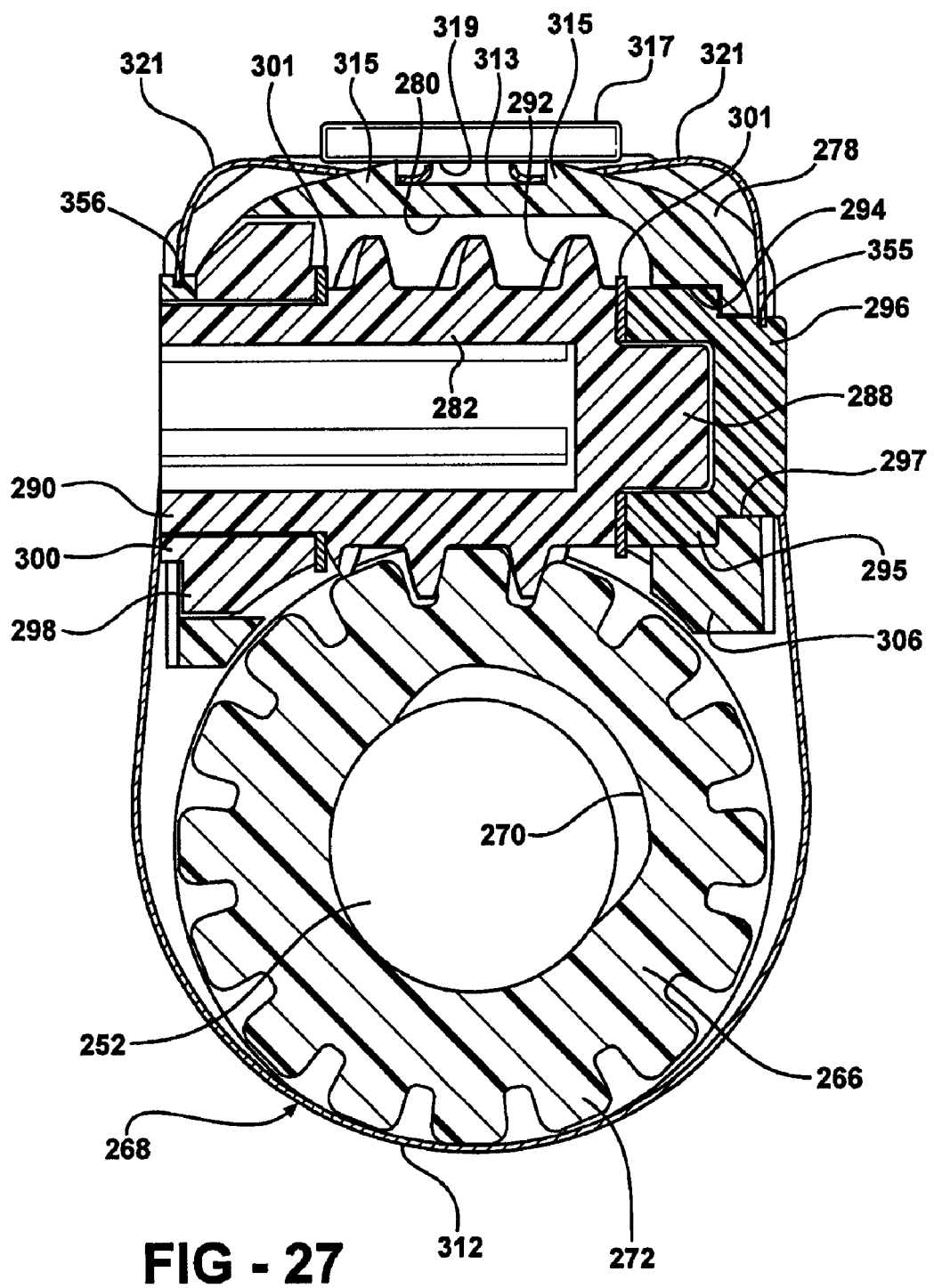
FIG. 27 is a cross-sectional end view of the drive assembly of FIG. 19 including a stepped bearing and an end plug having eccentric annular grooves according to a ninth embodiment of the invention.

Referring to FIG. 27, in a ninth embodiment of the invention, each of the stepped bearing 295 and the end plug 298 include an eccentric annular groove 355, 356 similar to the eccentric annular groove 156 in the end plug 98, as set forth in the fifth embodiment. More specifically, the stepped portion 296 of the stepped bearing 295 includes the eccentric groove 355 formed therearound and the stepped portion 300 of the end plug 298 includes the eccentric groove 356 formed therearound. Thus, the hole 316 in the outboard, upright portion 310 of the retainer strap 268 engages the eccentric groove 355 in the stepped bearing 295 and the hole 316 in the inboard, upright portion 310 of the retainer strap 268 engages the eccentric groove 356 in the end plug 298. Therefore, the maximum distance between the center line of the worm 282 and the center line of the gear 266 can be adjusted by rotating the stepped bearing 295 and end plug 298 to shorten or lengthen the effective length of the retainer strap 268 accordingly.

For example, if the vertical preload between the worm 282 and gear 266 is too small, i.e., the worm 282 and gear 266 are meshing too loosely, the stepped bearing 295 and end plug 298 can be rotated to decrease the maximum distance between the center line of the worm 282 and the center line of the gear 266. Decreasing the maximum center distance in turn increases the vertical preload between the worm 282 and the gear 266. On the other hand, if the vertical preload between the worm 282 and gear 266 is too large, i.e., the worm 282 and gear 266 are meshing too tightly, the stepped bearing 295 and end plug 298 can be rotated to increase the maximum distance between the center line of the worm 282 and the center line of the gear 266. Increasing the maximum center distance in turn decreases the vertical preload between the worm 282 and the gear 266. It is appreciated that a plurality of serrations (not shown) around the outer circumference of the stepped bearing 295 and the end plug 298 will prevent the stepped bearing 295 and end plug 298 from further rotation once a desired rotational position is selected.

Figure 28:
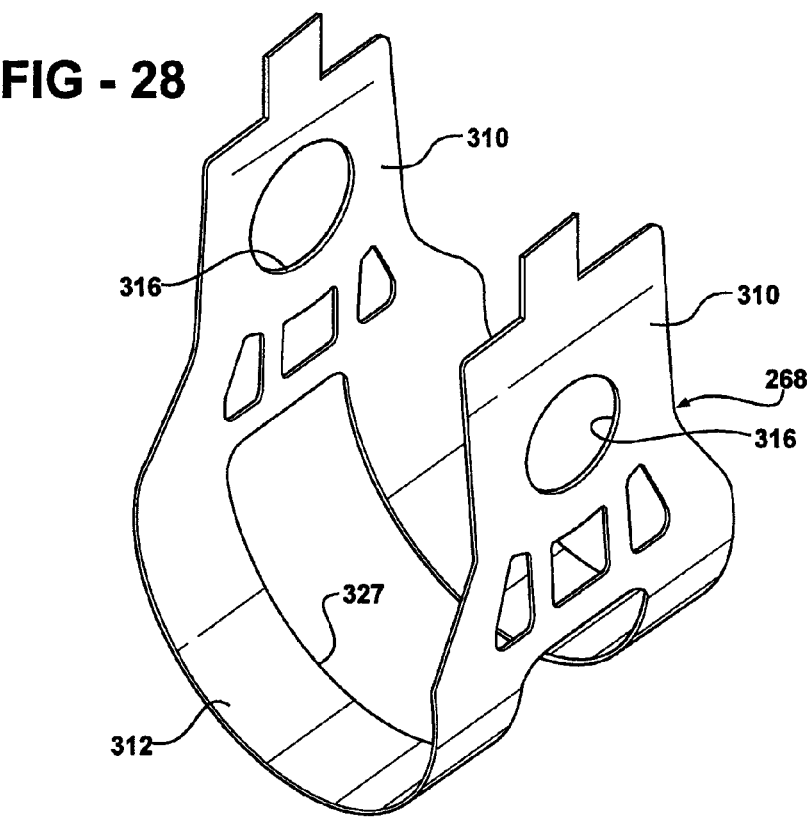
FIG. 28 is a perspective view of a generally U-shaped retainer strap for use with a tenth embodiment of the invention.
Figure 29:
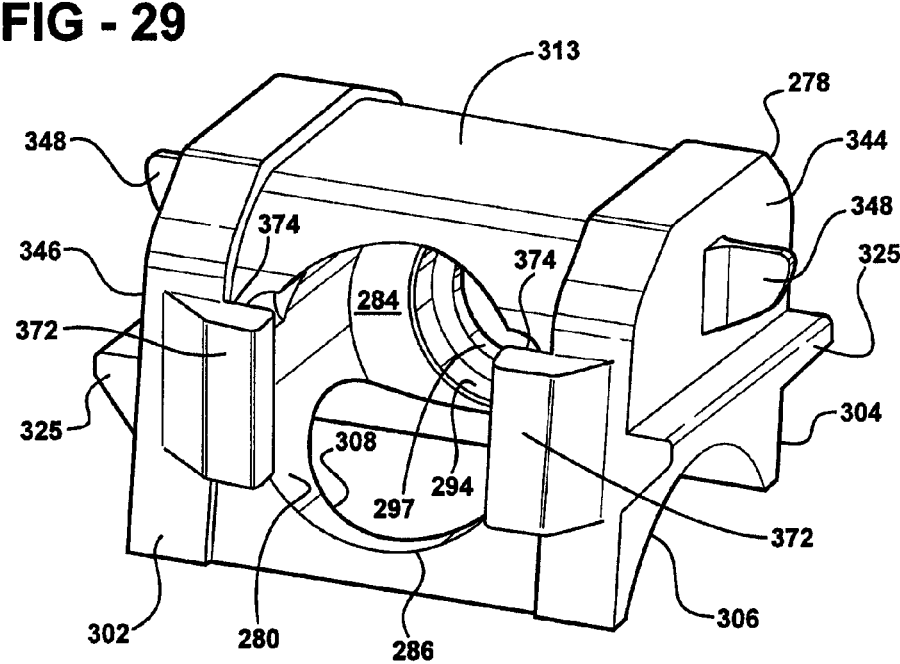
FIG. 29 is a perspective view of a housing for use with the retainer strap of FIG. 28.

Referring to FIGS. 28 and 29, in a tenth embodiment of the invention, the locking tabs 315 and flanges 317 have been removed from the upper surface 313 of the housing 278. Additionally, the upright portions 310 of the retainer strap 268 do not include the locking portions 321 for lockingly engaging the locking tabs 315. Therefore, in order to align and couple the worm sub-assembly 264 and the gear 266 together the hole 316 in each upright portion 310 engages an annular groove (or eccentric groove 355, 356) in the respective stepped bearing 295 and end plug 298. More specifically, the hole 316 in the outboard, upright portion 310 of the retainer strap 268 engages the annular groove (or eccentric groove 355) in the stepped bearing 295 and the hole 316 in the inboard, upright portion 310 of the retainer strap 268 engages the annular groove (or eccentric groove 356) in the end plug 298. A pair of spaced apart flanges 372 extend vertically along the inboard 302 and outboard 304 sides of the housing 278 (only the inboard side flanges are shown). Each flange 372 defines an undercut 374 for retaining an edge of the upright portion 310 of the retainer strap 268 to prevent the holes 316 from disengaging from the annular grooves (or eccentric grooves 355, 356) in the stepped bearing 295 and the end plug 298, respectively.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A drive assembly comprising:
   a threaded screw;
   a gear rotatably disposed about said threaded screw, said gear including a geared outer surface;
   a housing including a bore and a lower arcuate surface with an opening therethrough, said bore extending between a closed end and an opposing open end;
   a rotatably driven worm disposed within said bore of said housing and extending between a bearing end and a drive end, said worm including a threaded outer surface protruding through said opening in said lower arcuate surface of said housing and threadably engaging said geared outer surface of said gear; and
   a generally U-shaped retainer strap partially surrounding said gear and adapted to couple said housing and said gear together to align and preload said worm and said gear; wherein an end plug is disposed in said open end of said bore for rotatably supporting said driven end of said worm and wherein said retainer strap includes a first upright portion adapted to be coupled to said housing, a second upright portion adapted to be coupled to said end plug, and a generally U-shaped lower portion partially surrounding said gear.

2. An adjustment mechanism arranged between a movable member and a fixed member for moving the movable member relative to the fixed member, said adjustment mechanism comprising:
   a threaded screw fixedly secured to the fixed member;
   a gear rotatably disposed about said threaded screw, said gear including a geared outer surface;
   a housing including a bore and a lower arcuate surface with an opening therethrough, said bore extending between a closed end and an opposing open end;
   a rotatably driven worm disposed within said bore of said housing and extending between a bearing end and a drive end, said worm including a threaded outer surface protruding through said opening in said lower arcuate surface of said housing and threadably engaging said geared outer surface of said gear;
   a generally U-shaped retainer strap partially surrounding said gear and adapted to couple said housing and said gear together to align and preload said worm and said gear; wherein an end plug is disposed in said open end of said bore for rotatably supporting said driven end of said worm and wherein said retainer strap includes a first upright portion adapted to be coupled to said housing, a second upright portion adapted to be coupled to said end plug, and a generally U-shaped lower portion partially surrounding said gear; and
   a generally U-shaped bracket adapted to be fixedly secured to the movable member, wherein said gear, housing, worm, and retainer strap are disposed within said generally U-shaped bracket and said threaded screw passes through a pair of openings in said generally U-shaped bracket.

3. An adjustment mechanism as set forth in claim 2 wherein said first upright portion includes a hole therethrough for engaging a groove in said housing adjacent said closed end of said bore and said second upright portion includes a hole therethrough for engaging a groove in said end plug.

4. An adjustment mechanism as set forth in claim 3 wherein said lower surface of said housing is arcuate and wherein said gear includes a bushing at each end thereof, said bushings slidably engaging said arcuate lower surface and said generally U-shaped lower portion of said retainer strap.

5. An adjustment mechanism as set forth in claim 4 wherein said gear includes a recessed lip at each end thereof for receiving each of said bushings thereon.

6. An adjustment mechanism as set forth in claim 5 wherein said generally U-shaped lower portion of said retainer strap comprises three flat segments to minimize contact with said bushings.

7. An adjustment mechanism as set forth in claim 6 wherein said generally U-shaped bracket includes a base and two spaced apart sides extending from said base, said sides each have an opening allowing said threaded screw to pass therethrough and a perpendicular flange for mounting said bracket to said movable track.

8. An adjustment mechanism as set forth in claim 2 further including a ball bearing rotatably disposed at said closed end of said bore for reducing rotational friction between said bearing end of said worm and said housing.

9. An adjustment mechanism as set forth in claim 7 further including a crush rib extending from each of a front side and a rear side of said housing for compressing engagement with said sides of said bracket to prevent movement of said housing between said sides.

10. An adjustment mechanism as set forth in claim 7 further including a generally U-shaped spring clip disposed between said movable track and said end plug for axially preloading said worm against said gear.

11. An adjustment mechanism as set forth in claim 7 wherein said first and second upright portions of said retainer strap include at least one ear extending generally upwardly therefrom for engagement with the movable member to prevent movement of said housing.

12. An adjustment mechanism as set forth in claim 7 further including a wave washer disposed between said end plug and said drive end of said worm to axially preload said worm against said gear.

13. An adjustment mechanism as set forth in claim 7 wherein said housing includes a collar extending therefrom adjacent said open end of said bore, said collar including an upper slot extending therethrough and aligned with said groove in said end plug, wherein said opening in said second upright portion of said retainer strap engages said groove in said end plug through said upper slot.

14. An adjustment mechanism as set forth in claim 7 wherein said groove in said end plug defines an annular groove extending therearound.

15. An adjustment mechanism as set forth in claim 14 wherein a depth of said annular groove in said end plug is eccentric such that said depth varies from a minimum depth to a maximum depth, whereby rotation of said end plug increases and decreases a vertical preload between said worm and said gear.

16. An adjustment mechanism as set forth in claim 15 wherein an outer circumference of said end plug includes a plurality of serrations disposed therearound, said plurality of serrations engaging an inner circumference of said bore at said open end to prevent rotation of said end plug once a desired rotational position is selected.

17. An adjustment mechanism as set forth in claim 2 wherein said bore in said housing extends between a partially closed end and an opposing open end, said partially closed end defining a stepped recess and an opening therethrough, said worm extending between a bearing end at said partially closed end of said bore and a driven end at said open end of said bore.

18. An adjustment mechanism as set forth in claim 17 further including a stepped bearing disposed in said stepped recess of said bore for rotatably supporting said bearing end of said worm, wherein said stepped bearing includes a stepped portion extending through said opening in said partially closed end of said bore, and an end plug disposed in said open end of said bore for rotatably supporting said driven end of said worm, wherein said end plug includes a stepped portion extending through said open end of said bore.

19. An adjustment mechanism as set forth in claim 18 wherein said retainer strap includes a first upright portion adapted to capture said stepped portion of said stepped bearing and lockingly engage with said housing, a second upright portion adapted to capture said stepped portion of said end plug and lockingly engage with said housing, and a generally U-shaped lower portion partially surrounding said gear.

20. An adjustment mechanism as set forth in claim 19 wherein an upper surface of said housing includes a pair of laterally spaced apart locking tabs, and wherein an upper end of each of said first and second upright portions of said retainer strap include a locking portion extending generally perpendicular therefrom, each said locking portion adapted for locking engagement with one of said locking tabs.

21. An adjustment mechanism as set forth in claim 20 wherein said first upright portion includes a hole therethrough for capturing said stepped portion of said stepped bearing, said second upright portion includes a hole therethrough for capturing said stepped portion of said end plug, and each said locking portion includes a window for receiving one of said locking tabs therein.

22. An adjustment mechanism as set forth in claim 21 wherein said upper surface of said housing includes a pair of spaced apart flanges extending laterally therealong, said flanges overhanging opposing edges of each said locking portion thereby preventing each said locking portion from disengaging from said locking tabs.

23. An adjustment mechanism as set forth in claim 22 wherein said lower surface of said housing is arcuate and wherein said gear includes a bushing at each end thereof, said bushings slidably engaging said arcuate lower surface and said generally U-shaped lower portion of said retainer strap.

24. An adjustment mechanism as set forth in claim 23 wherein said generally U-shaped bracket includes a base and two spaced apart sides extending from said base, said sides each have an opening allowing said threaded screw to pass therethrough and a perpendicular flange for mounting said bracket to said movable track.

25. An adjustment mechanism as set forth in claim 24 wherein said housing includes a crush rib extending from each of a front side and a rear side for compressing engagement with said sides of said bracket to prevent movement of said housing between said sides of said bracket.

26. An adjustment mechanism as set forth in claim 25 wherein said housing includes a laterally extending rib disposed along each of said front and rear sides, said ribs centering said housing between said sides of said bracket.

27. An adjustment mechanism as set forth in claim 26 wherein said threading engagement between said worm and said gear is defined by belly-to-belly contact wherein a central face portion of each worm tooth engages a face of each gear tooth.

28. An adjustment mechanism as set forth in claim 27 wherein leading and trailing edges of each said worm tooth are shaped to prevent contact with each said gear tooth.

29. An adjustment mechanism as set forth in claim 21 wherein said hole in said first upright portion engages an eccentric groove in said stepped bearing and said hole in said second upright portion engages an eccentric groove in said end plug whereby rotation of said stepped bearing and said end plug increases and decreases a vertical preload between said worm and said gear.

30. An adjustment mechanism as set forth in claim 18 wherein said retainer strap includes a first upright portion having a hole engaging a groove in said stepped portion of said stepped bearing, a second upright portion having a hole engaging a groove in said stepped portion of said end plug, and a generally U-shaped lower portion partially surrounding said gear.

31. An adjustment mechanism as set forth in claim 30 wherein inboard and outboard sides of said housing each include a pair of spaced apart flanges extending vertically therealong, said flanges on said outboard side overhanging opposing edges of said first upright portion thereby preventing said first upright portion from disengaging from said stepped bearing and said flanges on said inboard side overhanging opposing edges of said second upright portion thereby preventing said second upright portion from disengaging from said end plug.

32. A power seat track assembly for moving a seat fore and aft along a floor in a motor vehicle, said power seat track assembly comprising:
a fixed track adapted to be mounted to the floor and a movable track slidably engaging said fixed track;
a threaded screw fixedly secured to said fixed track;
a gear rotatably disposed about said threaded screw, said gear including a geared outer surface;
a housing including a bore and a lower arcuate surface with an opening therethrough;
a worm rotatably disposed within said bore of said housing and extending between a bearing end and a driven end, said worm including a threaded outer surface protruding through said opening in said lower arcuate surface of said housing and threadably engaging said geared outer surface of said gear;
a generally U-shaped retainer strap partially surrounding said gear and adapted to couple said housing and said gear together to align and preload said worm and said gear;
a generally U-shaped bracket adapted to be fixedly secured to said movable track, wherein said gear, housing, worm, and retainer strap are disposed within said generally U-shaped bracket and said threaded screw passes through a pair of openings in said generally U-shaped bracket; and
a drive operatively coupled to said driven end of said worm, whereby rotation of said worm causes said gear to rotate and travel along said threaded screw thereby urging said generally U-shaped bracket and said movable track fore and aft.

33. A power seat track assembly as set forth in claim 32 wherein said bore in said housing extends between a closed end and an opposing open end, and wherein said bearing end of said worm is disposed at said closed end and said driven end of said worm is disposed at said open end.

34. A power seat track assembly as set forth in claim 32 wherein said bore in said housing extends between a partially closed end defining an opening therethrough and an opposing open end, and wherein said bearing end of said worm is disposed at said partially closed end and said driven end of said worm is disposed at said open end.

35. A power seat track assembly as set forth in claim 34 further including a bearing for rotatably supporting said bearing end of said worm, said bearing including an end portion extending through said opening in said partially closed end of said bore, and an end plug for rotatably supporting said driven end of said worm, said end plug including an end portion extending through said open end of said bore.

36. A power seat track assembly as set forth in claim 35 wherein said retainer strap includes a first upright portion adapted to capture said end portion of said bearing and lockingly engage with said housing, a second upright portion adapted to capture said end portion of said end plug and lockingly engage with said housing, and a generally U-shaped lower portion partially surrounding said gear.

* * * * *